US011823321B2

(12) United States Patent
Zhdan et al.

(10) Patent No.: US 11,823,321 B2
(45) Date of Patent: Nov. 21, 2023

(54) DENOISING TECHNIQUES SUITABLE FOR RECURRENT BLURS

(71) Applicant: NVIDIA Corporation, Santa Clara, CA (US)

(72) Inventors: Dmitriy Zhdan, Korolev (RU); Evgeny Makarov, Moscow (RU)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/942,542

(22) Filed: Sep. 12, 2022

(65) Prior Publication Data

US 2023/0005211 A1   Jan. 5, 2023

Related U.S. Application Data

(63) Continuation of application No. 17/203,267, filed on Mar. 16, 2021, now Pat. No. 11,508,113.

(60) Provisional application No. 62/991,000, filed on Mar. 17, 2020.

(51) Int. Cl.
*G06T 15/06* (2011.01)
*G06T 5/20* (2006.01)
*G06N 20/00* (2019.01)
*G06T 15/50* (2011.01)
*G06T 5/00* (2006.01)

(52) U.S. Cl.
CPC ............ *G06T 15/06* (2013.01); *G06N 20/00* (2019.01); *G06T 5/002* (2013.01); *G06T 5/20* (2013.01); *G06T 15/506* (2013.01)

(58) Field of Classification Search
CPC ...................................................... G06T 15/06
See application file for complete search history.

(56) References Cited

U.S. PATENT DOCUMENTS

| 11,508,113 | B2 | 11/2022 | Zhdan et al. | |
|---|---|---|---|---|
| 2016/0321523 | A1* | 11/2016 | Sen | ........................ G06N 3/084 |
| 2019/0287294 | A1* | 9/2019 | Liu | ......................... G06T 15/60 |

(Continued)

OTHER PUBLICATIONS

Moon, B., Jun, J., Lee, J., Kim, K., Hachisuka, T. and Yoon, S., 2013. Robust Image Denoising Using a Virtual Flash Image for Monte Carlo Ray Tracing. Computer Graphics Forum, 32(1), pp. 139-151 (Year: 2013).*

(Continued)

*Primary Examiner* — Shivang I Patel
(74) *Attorney, Agent, or Firm* — Taylor English Duma L.L.P.

(57) ABSTRACT

Recurrent blurring may be used to render frames of a virtual environment, where the radius of a filter for a pixel is based on a number of successfully accumulated frames that correspond to that pixel. To account for rejections of accumulated samples for the pixel, ray-traced samples from a lower resolution version of a ray-traced render may be used to increase the effective sample count for the pixel. Parallax may be used to control the accumulation speed along with an angle between a view vector that corresponds to the pixel. A magnitude of one or more dimensions of a filter applied to the pixel may be based on an angle of a view vector that corresponds to the pixel to cause reflections to elongate along an axis under glancing angles. The dimension(s) may be based on a direction of a reflected specular lobe associated with the pixel.

21 Claims, 25 Drawing Sheets

(56) References Cited

U.S. PATENT DOCUMENTS

2020/0058105 A1      2/2020    Liu et al.

OTHER PUBLICATIONS

Bavoil, L. and Andersson, J., "Stable SSAO in Battlefield 3 with Selective Temporal Filtering", Game Developers Conference, Rerived from Internet URL : https://developer.nvidia.com/sites/default/files/akamai/gamedev/files/gdc12/GDC12_Bavoil_Stable_SSAO_In_BF3_With_STF.pdf, accessed on Feb. 19, 2021, pp. 58 (2012).

Heitz, E., "Sampling the GGX Distribution of Visible Normals", Journal of Computer Graphics Techniques, vol. 7, No. 4, Retrieved from Internet URL : http://jcgt.org/published/0007/04/01/paper.pdf, accessed on Feb. 19, 2021, pp. 13 (2018).

Lagarde, S. and De Rousiers C., "Moving Frostbite to Physically Based Rendering 3.0", SIGGRAPH, Retrieved from Internet URL : https://seblagarde.files.wordpress.com/2015/07/course_notes_moving_frostbite_to_pbr_v32.pdf, accesed on Feb. 19, 2021, pp. 1-69 (2014) (Part 1).

Lagarde, S. and De Rousiers C., "Moving Frostbite to Physically Based Rendering 3.0", SIGGRAPH, Retrieved from Internet URL : https://seblagarde.files.wordpress.com/2015/07/course_notes_moving_frostbite_to_pbr_v32.pdf, accessed on Feb. 19, 2021, pp. 70-121 (2014) (Part 2).

Shyshkovtsov, O. et al., "Exploring Raytraced Future in Metro Exodus", NVIDIA, Retrieved from Internet URL : https://developer.download.nvidia.com/video/gputechconf/gtc/2019/presentation/s9985-exploring-ray-traced-future-in-metro-exodus.pdf, accessed on Feb. 19, 2021, pp. 105 (2019).

Barladian, B., et al., "An efficient multithreading algorithm for the simulation of global illumination", Programming and Computer Software, Consutants Bureau, New York, NY, US, vol. 43, No. 4, pp. 217-223 (2017).

Schied, C., et al., "Spatiotemporal variance-guided filtering : real-time reconstruction for path-traced global illumination", HPG, USA, pp. 1-12, Jul. 28, 2017.

International Search Report and Written opinion received for PCT Patent Application No. PCT/US2021/022588, dated Sep. 7, 2021, 6 pgs.

Zhdan, Dmitriy; International Preliminary Report on Patentability for PCT Application No. PCT/US2021/022588, filed Mar. 16, 2021, dated Sep. 29, 2022, 14 pgs.

\* cited by examiner

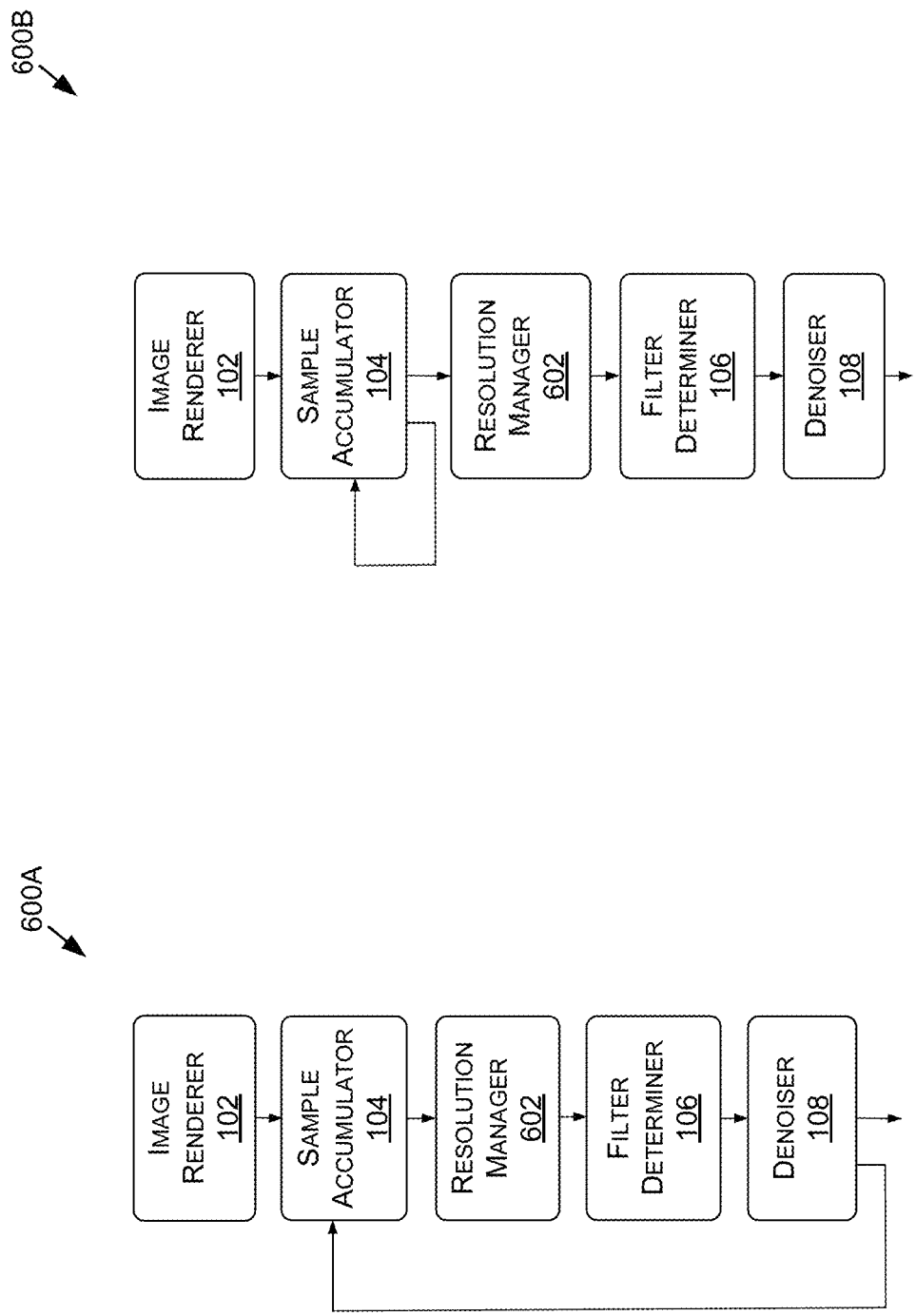

DENOISING TECHNIQUES SUITABLE FOR RECURRENT BLURS

CROSS-REFERENCE TO RELATED APPLICATIONS

This application is a Continuation of U.S. application Ser. No. 17/203,267, filed Mar. 16, 2021, which claims the benefit of U.S. Provisional Application No. 62/991,000, filed on Mar. 17, 2020, both of which are hereby incorporated by reference in their entirety.

BACKGROUND

Ray-tracing may be used to render images by tracing a path of light in a virtual environment and simulating the effects of the light's encounters with virtual objects. Various applications of ray-tracing technology may simulate a variety of optical effects—such as shadows, reflections and refractions, scattering phenomenon, ambient occlusions, global illuminations, and dispersion phenomenon (such as chromatic aberration). Ray-tracing typically involves generating ray-traced samples by casting rays in a virtual environment to sample lighting conditions for pixels. The ray-traced samples may be combined and used to determine pixel colors for an image. To conserve computing resources, the lighting conditions may be sparsely sampled, resulting in noisy render data. To produce a final render that approximates a render of a fully-sampled scene, a denoising filter may be applied to the noisy render data to reduce noise and temporal accumulation may be used to increase the effective sample count by leveraging information from previous frames.

Denoising strategies that involve temporal accumulation typically use either post-accumulation or pre-accumulation. In post-accumulation, a frame of noisy render data is first blurred, then temporally accumulated with similar blurred frames that were previously blurred. In pre-accumulation, the frames of noisy render data are first temporally accumulated, then the temporally accumulated data is blurred. In either case artifacts may result, as low and high frequency inputs are not mixed in blurring. Recurrent blur may be used to mix low and high frequency inputs by iteratively accumulating a frame of noisy render data with temporally accumulated data, then blurring the accumulated data to generate an output that is fed back to update the temporally accumulated data for a subsequent iteration. However, as recurrent blur feeds back a blurred output that is then used for blurring, this approach may be prone to over-blurring.

SUMMARY

This disclosure relates to denoising techniques for recurrent blurs in ray-tracing applications. More specifically, the current disclosure relates to various approaches which may be used to improve denoising of ray-traced renders, such as denoising that employs recurrent blurs. Various disclosed concepts may be incorporated into blurring that leverages temporal accumulation.

In contrast to traditional systems, the disclosure may provide for recurrent blurring in order to render frames of a virtual environment, where the radius (or more generally dimension or size) of at least one denoising filter for a pixel is based at least on a number of successfully accumulated frames or samples that correspond to that pixel. A hierarchical approach may be used to account for rejections of temporally accumulated samples with respect to pixels where rather than using only the ray-traced sample(s) from a ray-traced render for that pixel, ray-traced samples from a lower resolution version of the ray-traced render may be used to increase the effective sample count. Parallax may be used to control the accumulation speed of temporal accumulation for a pixel along with an angle between a view vector that corresponds to the pixel to account for how parallax is perceived visually at different viewing angles.

Rather than applying a denoising filter to the pixel that is effectively isotropic in world space, a magnitude of one or more dimensions of the filter may be based at least on an angle of a view vector that corresponds to the pixel to cause reflections to elongate along an axis under glancing angles, resulting in a more realistic render. The dimension(s) may be based at least on a direction (e.g., dominant direction) of a reflected specular lobe associated with the view vector and a corresponding surface normal.

BRIEF DESCRIPTION OF THE DRAWINGS

The present systems and methods for denoising techniques suitable for recurrent blurs are described in detail below with reference to the attached drawing figures, wherein:

FIG. 6A is a flow diagram showing an example process for denoising using recurrent blur that includes generating an augmented sample based at least on a quantity of renders of a virtual environment that correspond to a ray-traced sample in an accumulated render, in accordance with at least one embodiment of the present disclosure;

FIG. 6B is a flow diagram showing an example process for denoising using pre-accumulation that includes generating an augmented sample based at least on a quantity of renders of a virtual environment that correspond to a ray-traced sample in an accumulated render, in accordance with at least one embodiment of the present disclosure;

DETAILED DESCRIPTION

Figure 1:
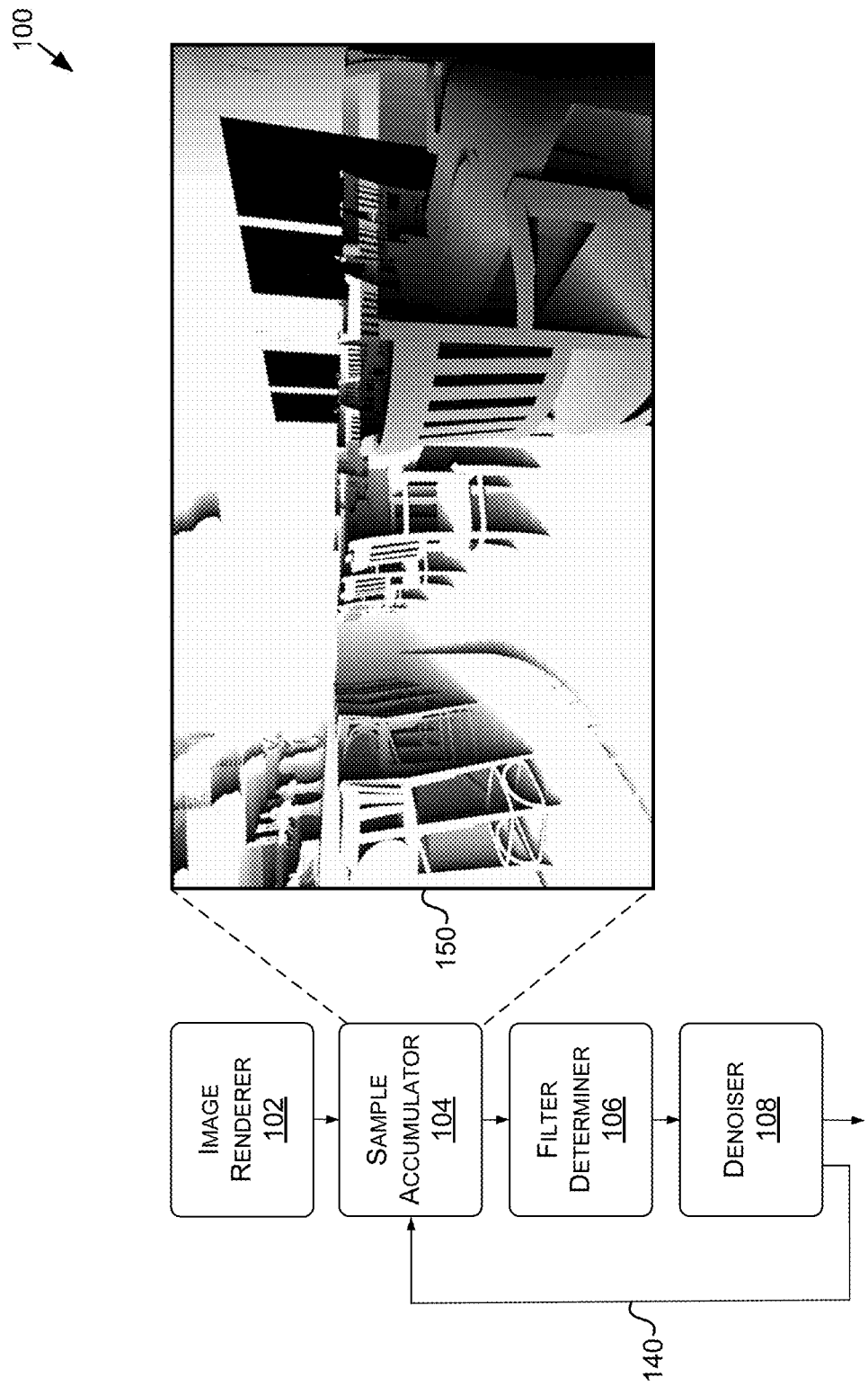
FIG. 1 is a data flow diagram illustrating an example process for determining one or more filter parameters based at least on accumulated samples, in accordance with at least one embodiment of the present disclosure.

Systems and methods are disclosed related to denoising techniques suitable for recurrent blurs. The disclosure provides various denoising techniques which may be used separately or in any combination thereof. Various disclosed concepts may be incorporated into blurring that leverages temporal accumulation.

Aspects of the disclosure may provide for recurrent blurring in order to render frames of a virtual environment, where the radius (or more generally dimension or size) of at least one denoising filter for a pixel is based at least on a number of successfully accumulated frames that correspond to that pixel (e.g., temporally accumulated samples in a history buffer). For example, the number of successfully accumulated frames may be tracked per-pixel and may be used to control or adapt the blur dimensions of denoising filters applied to those pixels (e.g., in one or more spatial filtering passes). These approaches may be used to reduce sizes of denoising filters for pixels as the number of accumulated samples or frames associated with those pixels increases, thereby reducing or preventing over-blurring.

Aspects of the disclosure may also provide for a hierarchical approach to accounting for rejections of temporally accumulated samples with respect to pixels. Typically when a temporally accumulated sample for a pixel gets rejected—for example, due to a disocclusion of the pixel in ray-tracing—temporal accumulation for that pixel is reset. Thus, the effective sample count for the pixel may be reduced for a number of frames as temporal data is re-accumulated. This may result in artifacts in rendered frames, particularly when the number of rays per-pixel used to sample a virtual environment for the pixel is low.

Disclosed approaches may supplement the effective number of rays per-pixel used to sample a virtual environment for a pixel based at least on a quantity of successfully accumulated frames, renders, and/or samples that correspond to that pixel. For example, in a denoising pipeline, rather than using only the ray-traced sample(s) from a ray-traced render for that pixel, ray-traced samples from a lower resolution version of the ray-traced render may be used. In various embodiments, the resolution level (e.g., a mipmap level) may be based at least on the quantity of successfully accumulated frames and may increase with the quantity of successfully accumulated frames (e.g., until a base resolution of the ray-traced render is reached). For example, the quantity of successfully accumulated frames may be tracked per-pixel and may be used to control, or adapt, the resolution of the ray-traced render that is used in combination with or in place of temporally accumulated data for those pixels (e.g., before or after one or more spatial filtering passes). This approach may be used in combination with recurrent blurring, which may or may not adapt denoising filter size based at least on the numbers of successfully accumulated frames. It is also contemplated that these approaches may be implemented using other denoising strategies, such as post-accumulation or pre-accumulation.

Aspects of the disclosure may also provide for approaches to compute one or more dimensions of an anisotropic denoising filter (e.g., filter kernel) applied to a pixel when denoising a ray-traced render. For example, rather than applying a denoising filter to a pixel that is effectively isotropic in world space, a magnitude of one or more dimensions of the filter may be based at least on an angle of a view vector that corresponds to the pixel. This may be used to cause reflections to elongate along an axis under glancing angles, resulting in a more realistic render. The disclosure provides for computing an anisotropic filter kernel that may be elongated so that a size of the filter kernel extends farther along a first axis than along a second axis to more closely reflect the footprint of a BRDF lobe in a virtual environment. In various examples, the dimension(s) may also be based at least on a direction (e.g., dominant direction) of a reflected specular lobe associated with the view vector and a corresponding surface normal. These approaches may be used in combination with recurrent blurring, post-accumulation, pre-accumulation, and/or other denoising strategies which may not necessarily include temporal accumulation.

Aspects of the disclosure may also provide for using parallax between frames or renders to control the accumulation speed of temporal accumulation (e.g., for specular accumulation). For example, surface motion may be used to reproject the specular history texture from a previous frame or render to a subsequent (e.g., current) frame or render. However, when light reflects off a surface, the motion of reflections may be different that surface motion, and therefore using only surface motion may result in artifacts in rendered frames. The accuracy of surface motion for a pixel may be based, at least in part on parallax between frames, and therefore may be used to control the impact of the surface motion in the temporal accumulation.

In various embodiments, parallax used to compute accumulation speed for a pixel may be based at least on an angle between view vectors that corresponds to the pixel. For example, parallax may correspond to an angle between previous and current view vectors for the same surface point(s). In at least one embodiment, parallax for a pixel may be computed as a ratio between a camera movement projection for the point(s) between renders or frames to the screen plane and a distance to the point(s). The accumulation speed may also be based at least on a viewing angle associated with the view vector of the ray-traced render, which may account for how parallax is perceived visually at different viewing angles. These approaches may be used in combination with recurrent blurring, post-accumulation, pre-accumulation, and/or other denoising strategies.

Disclosed approaches may be implemented, for example, using denoisers that accept radiance (e.g., only radiance and/or radiance in addition to other information). Diffuse and specular signals may or may not be separated, in accordance with various embodiments. For example, radiance, or energy coming from a particular direction, may be separated out from materials. In some embodiments, the final color for a pixel may be based at least on a multiplication or other combination of radiance (e.g., after denoising) applied to a physically-based light model that includes light properties. As an example, for diffuse radiance, the final color may be based at least on radiance multiplied by an albedo, which may essentially represent a base color. While disclosed approaches may be compatible with both specular and diffuse radiance, some embodiments may be adapted such that they only accommodate specular or diffuse radiance.

Disclosed approaches may generate ray-traced samples (e.g., of radiance) using any suitable approach to ray-tracing, such as stochastic ray-tracing. Examples of stochastic ray-tracing techniques that may be used include those that employ Monte Carlo or quasi-Monte Carlo sampling strategies. Disclosed approaches may account for such properties as surface reflections cast by various types of surfaces, such as glossy surfaces. To do so, a normal distribution function (NDF) may be employed. A non-limiting example of an NDF described herein is a GGX NDF, but other types of NDFs may be employed.

Although the disclosure refers to a roughness value of a surface at a point, surface roughness may be defined using any suitable approach, which may include using one or more roughness values. For example, where the NDF captures a GGX distribution, a single roughness value may be used. However, the examples provided herein may be adapted to other microfacet distribution models as needed. In various examples, the disclosure may be used with GGX, Beckman, Blinn-Phong, or other types of NDF distributions, which may also include non-standard distributions. Where multiple roughness values are defined, a single roughness value may be determined and used as described herein by combining and/or analyzing the roughness values, one of the roughness values may be used, or the approaches may otherwise be suitably adapted.

Disclosed systems may comprise or be included in one or more of a system for performing simulation operations, a system for performing simulation operations to test or validate autonomous machine applications, a system for performing deep learning operations, a system implemented using an edge device, a system incorporating one or more Virtual Machines (VMs), a system implemented at least partially in a data center, or a system implemented at least partially using cloud computing resources.

FIG. 1 is a data flow diagram illustrating an example process 100 for determining one or more filter parameters based at least on accumulated samples, in accordance with at least one embodiment of the present disclosure. The process 100 may be performed using, for example, an image renderer 102, a sample accumulator 104, a filter determiner 106, and a denoiser 108. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software.

Figure 22:
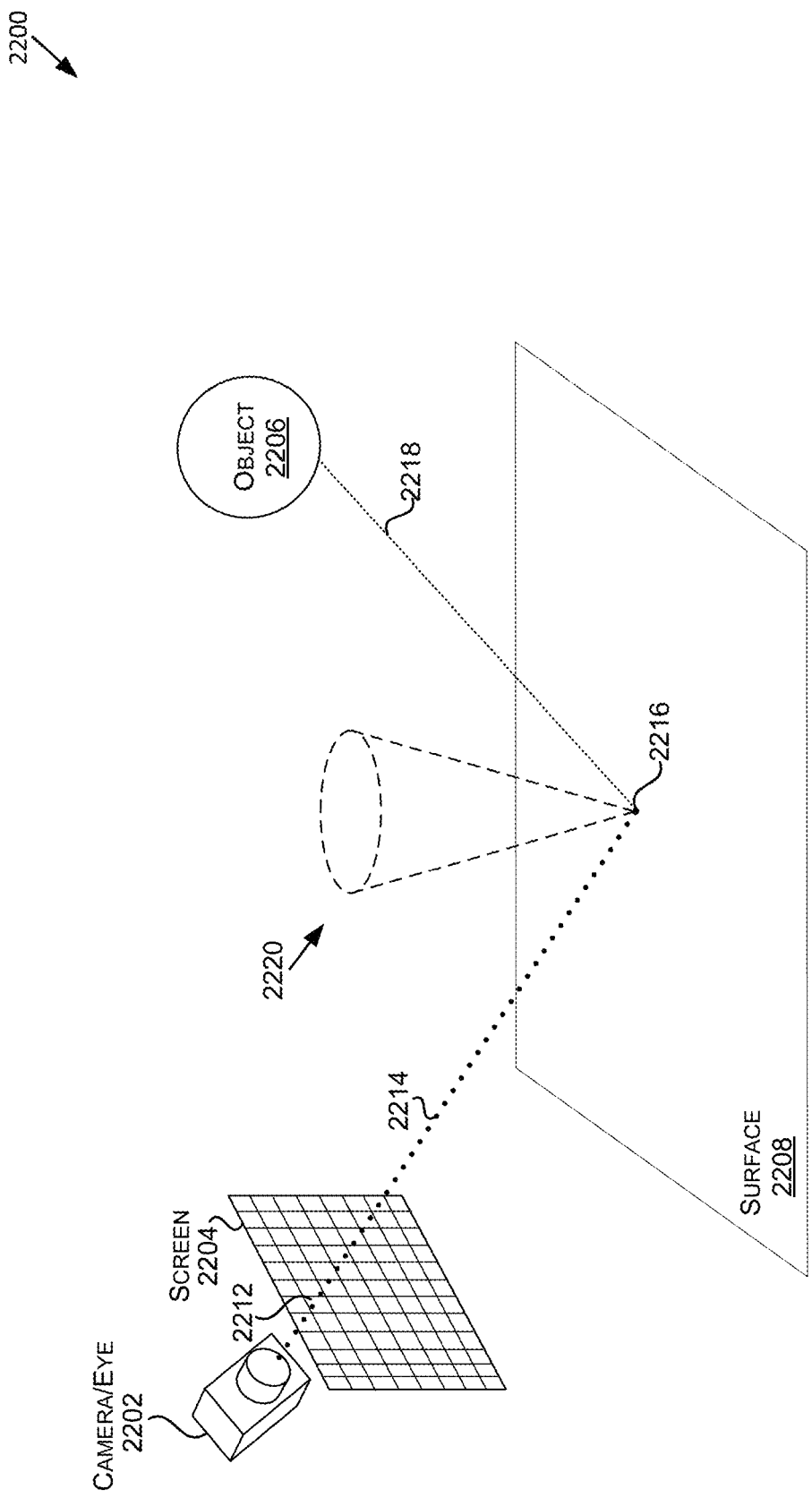
FIG. 22 is a diagram used to illustrate examples of ray-tracing techniques which may be used to generate ray-traced renders, in accordance with some embodiments of the present disclosure.

The image renderer 102 may be configured to render images of virtual environments (e.g., a virtual environment 2200 of FIG. 22). To render an image of a virtual environment, the image renderer 102 may employ the sample accumulator 104, the filter determiner 106, and the denoiser 108. The sample accumulator 104 may be configured to accumulate (e.g., temporally with respect to pixels) ray-traced samples (i.e., samples generated based on ray-tracing the virtual environment). The samples accumulated by the sample accumulator 104 may be used in various ways, for example, depending on whether post-accumulation, pre-accumulation, or recurrent blurring is used to render an image. The filter determiner 106 may be configured to determine—for a point in the virtual environment or corresponding pixel—at least one dimension (e.g., geometry) of a filter (e.g., a spatial filter) and corresponding filter weights of the filter. The denoiser 108 may be configured to apply the filter to a pixel (e.g., at an initial pixel position of the filter) that corresponds to the point in the virtual environment to denoise an image that is representative of the virtual environment (e.g., a ray-traced render, or frame).

The image renderer 102 may similarly use the sample accumulator 104, the filter determiner 106, and the denoiser 108 to determine filters for other points in the virtual environment and corresponding pixels in the image to produce a resultant image. Thus, multiple filters may be used to denoise lighting condition data (e.g., radiance) associated with the image to produce a resultant image (e.g., at least one filter per pixel), and those filters may all be applied in a single draw call, or pass (although multiple passes may be used for additional filters). Images described herein need not be fully rendered. As an example, one or more portions of visual content of an image and/or components thereof may be rendered (e.g., radiance). The denoiser 108 may apply filters to image data representative of the one or more portions of visual content of an image and/or components thereof to produce image data representative of a rendered frame (e.g., using any number of denoising passes). Images may be shown to illustrate noise that may be filtered in some examples of the disclosure.

The image renderer 102 may use the lighting condition data for each pixel to render one or more corresponding pixels of an image. Generally, the accuracy of the lighting conditions that the image renderer computes for a pixel with respect to a light source may increase with the quantity of primary and/or secondary rays used to sample the lighting conditions. However, the computing resources used to determine the lighting conditions also may increase with the quantity of rays, which may increase render times.

To preserve computing resources and to reduce render times, the quantity of rays used to sample lighting conditions may be below what is needed for reflection quality to converge to an ideal ray-traced result. This may result in the image renderer 102 generating lighting condition data that includes noisy image data, as indicated in various images throughout. For example, the lighting conditions of each pixel of a screen may be based on a single ray-traced sample (e.g., one ray-per pixel sampling) or other limited number of samples of a state of a virtual environment (e.g., comprising a single camera or eye ray and a single reflected ray per incident ray).

To reduce noise in the lighting condition data for the pixels, the denoiser 108 may filter the lighting condition data (ray-traced samples, accumulated samples, etc.) any number of times in order to generate a final rendered frame. In some examples, the filter determiner 106 may determine a filter for each pixel of a screen and/or render. The image renderer 102 may apply the filters to the lighting condition data at image (e.g., pixel) locations corresponding to the associated pixels to render a resultant image. In various examples, one or more of the filters may be applied in parallel. Further, each filter may be applied in one or more multiple passes (e.g., as a separable filter). Additionally, while examples of information used to determine properties of a filter are provided, additional information may be used that results in corresponding adjustments to the properties (e.g., dimensions and/or filter weights) of the filter.

Each filter described herein may comprise a filter kernel and may or may not include one or more filter directions. The filter kernel of a filter may refer to a matrix (e.g., rectangular array) that defines one or more convolutions for processing image data of an image to alter one or more characteristics of the image, such as shades and colors of the pixels of the image (e.g., through application to radiance). In some examples, a filter kernel may be applied as a separable filter in which the matrix may be represented using multiple sub-matrices, or filters, that may be applied to an image in multiple passes. When determining or computing a filter kernel for a separable filter, the disclosure contemplates that the sub-matrices may be directly computed, or may be derived from another matrix.

Each element of a matrix of a filter kernel may represent a respective pixel position. One of the pixel positions of a matrix may represent an initial pixel position that corresponds to a pixel to which the filter is applied and is typically located at the center of the matrix. For example, in various figures described herein, point p may correspond to an initial pixel position (e.g., also the point 2216 and/or the pixel 2212 of FIG. 22). A filter direction may define the alignment of the matrix relative to the image and/or pixel to which the filter is applied. Thus, when applying a filter to a pixel, other pixels for other pixel positions of a matrix of a filter kernel may be relative to the initial pixel position based on the filter direction.

Each element of a matrix of a filter kernel may comprise a filter weight for the pixel position (which may be a combination, such as a multiplication, of one or more sub-weights described herein). The matrix may be applied to an image using convolution, in which a data value for each pixel of the image that corresponds to a pixel position of the matrix may be added to data values for pixels that correspond to the local neighbors in the matrix, weighted by the filter values (also referred to as filter weights). The filter values may be configured to blur the pixels, such as by fitting a distribution(s) to a size of the filter kernel (e.g., to a width and a height), or otherwise modeling the filter weights, or values, using light-based models.

The data values to which a filter is applied may correspond to lighting condition data of the pixels (e.g., before or after prior denoising). Thus, the denoiser 108 applying a matrix of a filter kernel to a pixel may cause the lighting condition data to be at least partially shared amongst the pixels that correspond to the pixel positions of the filter kernel. The sharing of the lighting condition data may mitigate noise due to sparsely sampling lighting conditions in ray-tracing when the filter kernel accurately defines which pixels may share lighting condition data (e.g., via the size of the matrix and filter direction(s)) and how much lighting condition data may be shared (e.g., via the filter weights). As such, where the size, filter direction(s), and/or filter weights of the filter kernel do not accurately reflect lighting conditions of a virtual environment, the filter kernel may cause over-blurring and/or unrealistic blurring, resulting in unrealistic lighting conditions being represented in a rendered image.

The sample accumulator 104 may be configured to accumulate (e.g., temporally with respect to pixels) ray-traced samples (i.e., samples generated based on ray-tracing the virtual environment). Denoising approaches herein may employ the sample accumulator 104 to store accumulated samples in a history buffer and/or a texture (e.g., with respect to particular pixels). For example, the image renderer 102 may iteratively generate ray-traced renders and in each iteration, the sample accumulator 104 may accumulate one or more samples to a history buffer. At times, the sample accumulator 104 may reject one or more accumulated samples for use in a denoising iteration for a rendered frame (and/or subsequent iterations). For example, accumulated samples may be rejected for pixels and/or ray-traced samples from an input signal (e.g., a ray-traced render) that the system determines are not present in the history buffer (e.g., using projection to map ray-traced samples to accumulated samples).

By way of example and not limitation, when one or more pixels and/or ray-traced samples correspond to an occlusion event or a disocclusion event (e.g., as determined by the sample accumulator 104), accumulated samples being maintained by the sample accumulator 104 in the history buffer may be rejected and not used for those pixels and/or ray-traced samples. Rejections may occur as a camera or perspective used to render a virtual environment moves and/or an object in the virtual environment moves, causing occlusion and/or disocclusion events. In various embodiments, the sample accumulator 104 may analyze render data from ray tracing to determine such events, and if an event is identified (e.g., a disocclusion is found) for a pixel(s) and/or accumulated sample(s), a quantity of successfully accumulated frames may be reset (e.g., to zero) and accumulation may resume from scratch (e.g., for that accumulated sample(s)).

As some examples, the sample accumulator 104 may determine a disocclusion for a ray-traced sample or pixel based at least on a comparison between a corresponding current depth value (e.g., a z-value) and a corresponding previous depth value (e.g., determined using reprojection). Additionally or alternatively, the disocclusion may be determined for a ray-traced sample or pixel based at least on comparing plane distances. In various embodiments other suitable approaches may be employed.

The image renderer 102, the sample accumulator 104, the filter determiner 106, and the denoiser 108, may be configured differently depending upon the denoising strategy or strategies being employed. For post-accumulation, the sample accumulator 104 may accumulate samples after the denoiser 108 executes a blur or denoising pass on the sample. For pre-accumulation the sample accumulator 104 may accumulate samples before a blur or denoising pass is performed on the accumulated samples. An input signal to post-accumulation or pre-accumulation may include a ray-traced render and/or ray traced samples of a virtual environment (optionally after pre-processing, such as pre-blur). The input signal may have a very high frequency, particularly where it is sparsely sampled (e.g., with only one ray per-pixel). The input may also be referred to as ray-tracing output and/or denoising input. After blurring, the input signal may be converted into a lower frequency signal. In post-accumulation, the high frequency input may be blurred, then used to accumulate to a low frequency texture, and in pre-accumulation, the opposite may occur.

Recurrent blur or blurring may mix signals with wider frequencies. After the denoiser 108 performs blurring, the signal may have a lower frequency and may be put into a feedback loop (optionally after additional processing and/or blurring) as an input to the next frame and/or render to be accumulated by the sample accumulator 104 with a subsequent high frequency noisy input. It may also be referred to as a blur of a ray-traced render with a background, and that background may be accumulated with the currently incoming input signal from a ray-tracing process performed by the image renderer 102. As recurrent blur feeds back a blurred output (e.g., the blurred accumulated samples, or background) that is then used for blurring, this approach may be prone to over-blurring. The process 100 of FIG. 1 may be employed to reduce or prevent over-blurring, which may result in clearer output frames.

Adaptive Blur Radius

At a high level, the process 100 may include the image renderer 102 generating one or more outputs, such as a ray-traced render of a virtual environment (e.g., a virtual environment 2200 of FIG. 22). The process 100 may also include the sample accumulator 104 receiving one or more inputs, such as the ray-traced render and a denoised accumulated render from a prior iteration of the process 100, accumulating the input(s), and generating one or more outputs, such as an accumulated render. The process 100 may further include the filter determiner 106 receiving one or more inputs, such as counts of quantities of samples accumulated to pixels of the accumulated render, and generating one or more outputs, such as one or more dimensions of one or more filters. The process 100 may further include the denoiser 108 receiving one or more inputs, such as the one or more dimensions, and generating one or more outputs, such as the accumulated render denoised using the one or more filters.

As indicated in FIG. 1, the process 100 may leverage recurrent blurring to effectively redistribute spatial sampling in time due to its recursive nature. For example, after the denoiser 108 performs blurring of accumulated samples, the signal may have a lower frequency and may be put into a feedback loop 140 (optionally after additional processing and/or blurring) as an input to the sample accumulator 104 for the next frame and/or render to be accumulated by the sample accumulator 104 with a subsequent high frequency noisy input from the image renderer 102. The process 100 may leverage the sample accumulator 104 to increase the effective sample count of the ray-traced render generated by the image renderer 102. As a non-limiting example, if the Frames Per Second (FPS) of frames rendered by the image renderer 102 is at 30, and 8 ray-traced samples per pixel are employed to ray-trace a virtual environment, accumulation may effectively result in 240 ray-traced samples per second as a result of blurring the same texture (e.g., in the history buffer) repeatedly.

To reduce or eliminate over-blurring, which may result from recurrent blurs, aspects of the disclosure may provide for recurrent blurring in order to render frames of a virtual environment where the radius (or more generally dimension or size) of at least one denoising filter for a pixel(s) is determined by the filter determiner 106 based at least on a quantity of successfully accumulated frames that correspond to that pixel (e.g., temporally accumulated samples in the history buffer). For example, the sample accumulator 104 may track the quantity of successfully accumulated frames per-pixel and may be used to control, or adapt, the blur dimensions of denoising filters applied by the denoiser 108 to those pixels (e.g., in one or more spatial filtering passes).

Disclosed approaches may reduce the size of a blur filter for a pixel based on the contribution of accumulation to solving the final lighting integral for that pixel. This may allow filter sizes to be reduced as the contribution (e.g., quantity of samples accumulated to the history buffer) increases over a number of denoising iterations. If the history buffer gets rejected for a pixel, the contribution of accumulation for that pixel may be eliminated for at least one iteration and the size for a corresponding blur filter may be increased (e.g., when not considering other potential factors that may be used to impact the size of the filter).

In at least one embodiment, the sample accumulator 104 may increment one or more counters to track the quantity of successfully accumulated frames and/or samples (e.g., per-pixel). For example, a counter may be incremented per-iteration of the denoising iteration, per-accumulation, per-frame or render (e.g., once per successful accumulation for a pixel). If the sample accumulator 104 rejects one or more accumulated samples for use in a denoising iteration, the count may be reset (e.g., to zero) and accumulation may resume from scratch (e.g., for that accumulated sample(s)). For example, the count may be reset for pixels and/or ray-traced samples from an input signal (e.g., a ray-traced render) that the sample accumulator 104 determines are not present in the history buffer (e.g., using projection to map ray-traced samples to accumulated samples).

In FIG. 1, image 150 provides a visualization of quantities of successfully accumulated frames for pixels. A darker pixel may correspond to fewer accumulated samples or frames for that pixel, and lighter pixels may correspond to more accumulated samples or frames for that pixel. For example, black pixels may have a minimum count indicating no successfully accumulated frames (e.g., due to an occlusion event or a disocclusion event) and white pixels may have a maximum count indicating a maximum number of accumulated frames. By way of example and not limitation, the count may range from 0 to 32.

In at least one embodiment, the count may be used to compute an adjustment factor that is then used to compute one or more dimensions of a filter (e.g., blur radius). The adjustment factor may correspond to, for example, a computed result of an equation or portion thereof that uses the count as a variable. The adjustment factor may be proportional to or otherwise related to the quantity of accumulated frames and/or samples and may be computed per-pixel. In some embodiments, the quantity of accumulated frames that correspond to a sample(s) may be constrained to a maximum quantity of accumulated frames (e.g., 32). This number may be controlled by an end user and/or software and/or may be dynamic. Reducing the quantity of accumulated frames may reduce temporal lag. In at least one embodiment, the radius of a filter for a pixel may be largest upon a reset (e.g., count=0) and smallest upon reaching a maximum quantity of accumulated frames (e.g., count=32). By way of example, the radius scale for a pixel may be computed using Equation (1):

$$1/(1+\text{newCount}), \quad (1)$$

where newCount may refer to the updated count for the pixel in a denoising iteration after accumulation.

Figures 2A, 2B:
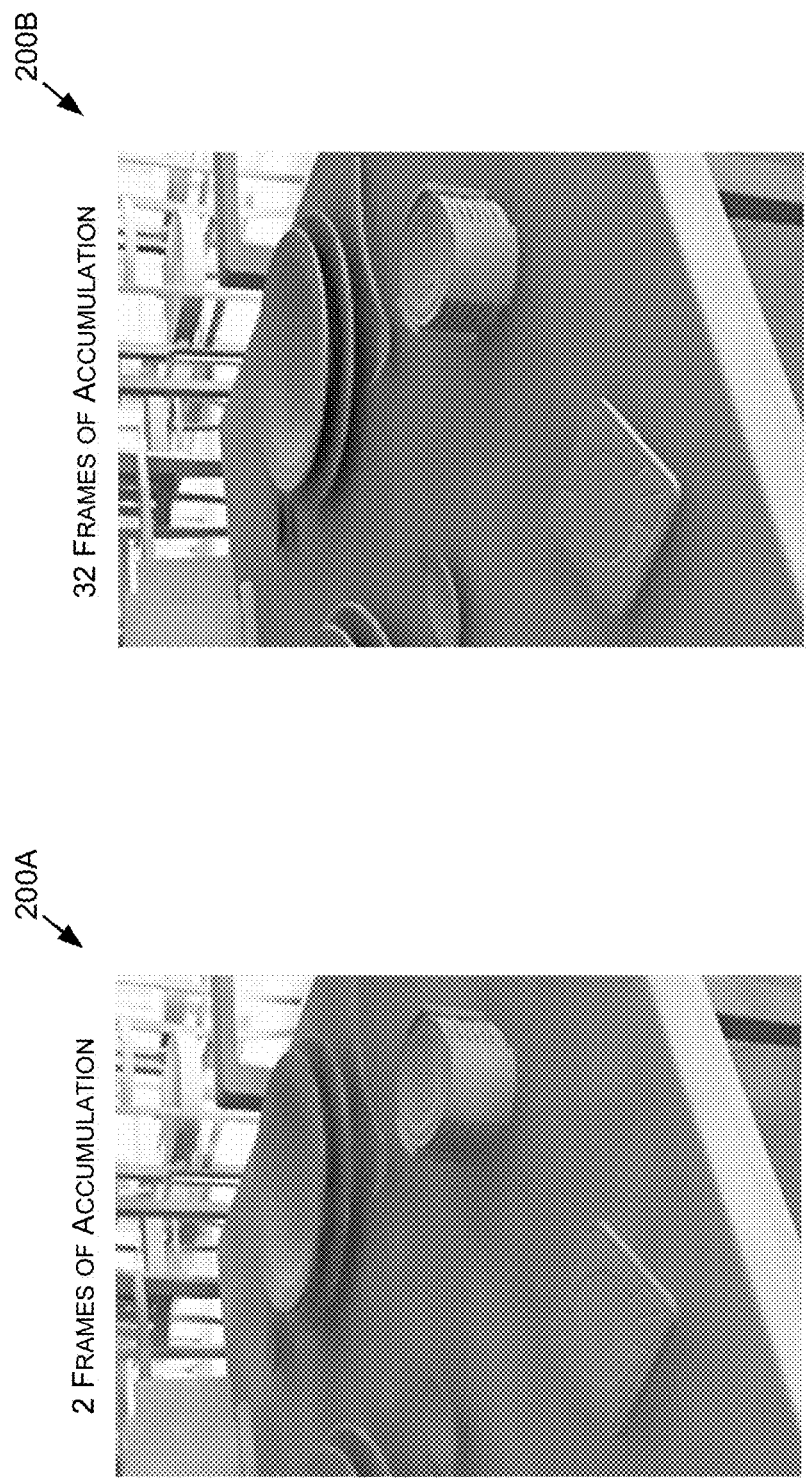
FIG. 2A shows an example render of a virtual environment which may be generated using the example process of FIG. 1 after two frames of accumulation, in accordance with at least one embodiment of the present disclosure.
FIG. 2B shows an example render of a virtual environment which may be generated using the example process of FIG. 1 after thirty-two frames of accumulation, in accordance with at least one embodiment of the present disclosure.

Referring now to FIGS. 2A and 2B, FIG. 2A shows a render 200A of a virtual environment which may be generated using the example process 100 of FIG. 1 after two frames of accumulation, in accordance with at least one embodiment of the present disclosure. FIG. 2B shows a render 200B of a virtual environment which may be generated using the example process 100 of FIG. 1 after thirty-two frames of accumulation, in accordance with at least one embodiment of the present disclosure. While counts and filter sizes may vary per-pixel, the renders 200A and 200B are examples where each pixel has the same count. As can be seen, with 2 frames of accumulation, the render 200A has less detail than the render 200B due to the denoiser 108 using filters with larger blur radii when blurring render data to generate the render 200A.

Figure 3:
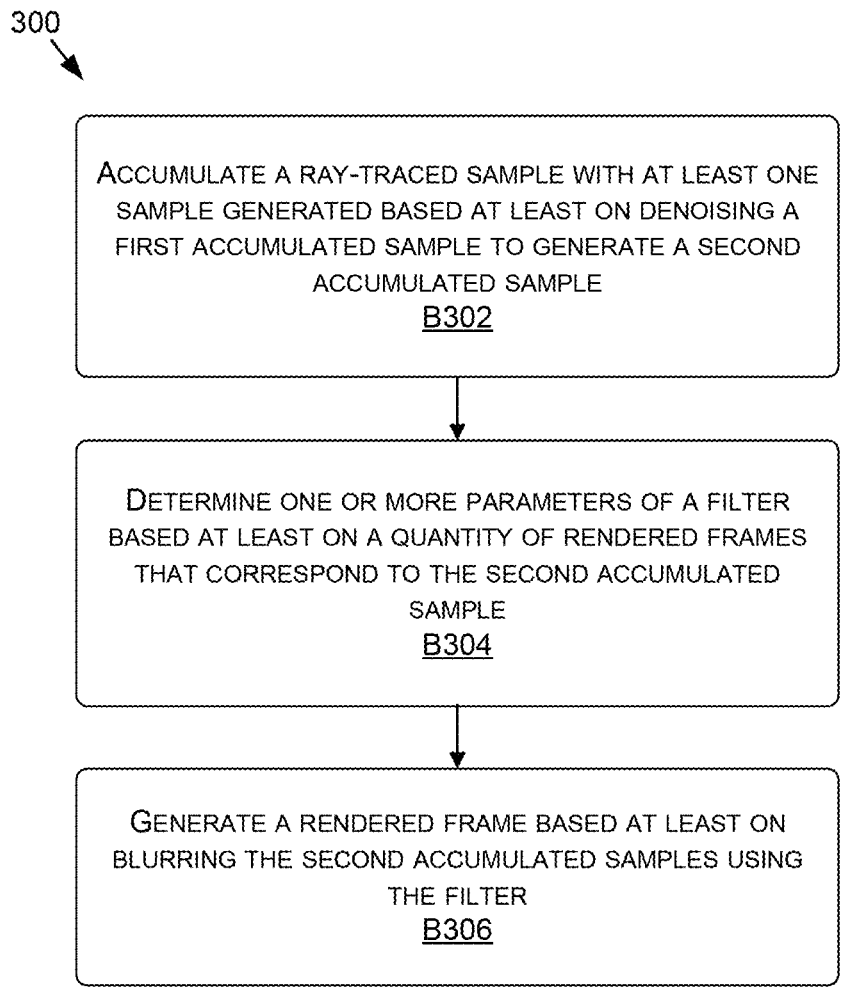
FIG. 3 is a flow diagram showing an example of a method for determining one or more parameters of a filter based at least on a quantity of rendered frames of a virtual environment, in accordance with at least one embodiment of the present disclosure.
Figure 4:
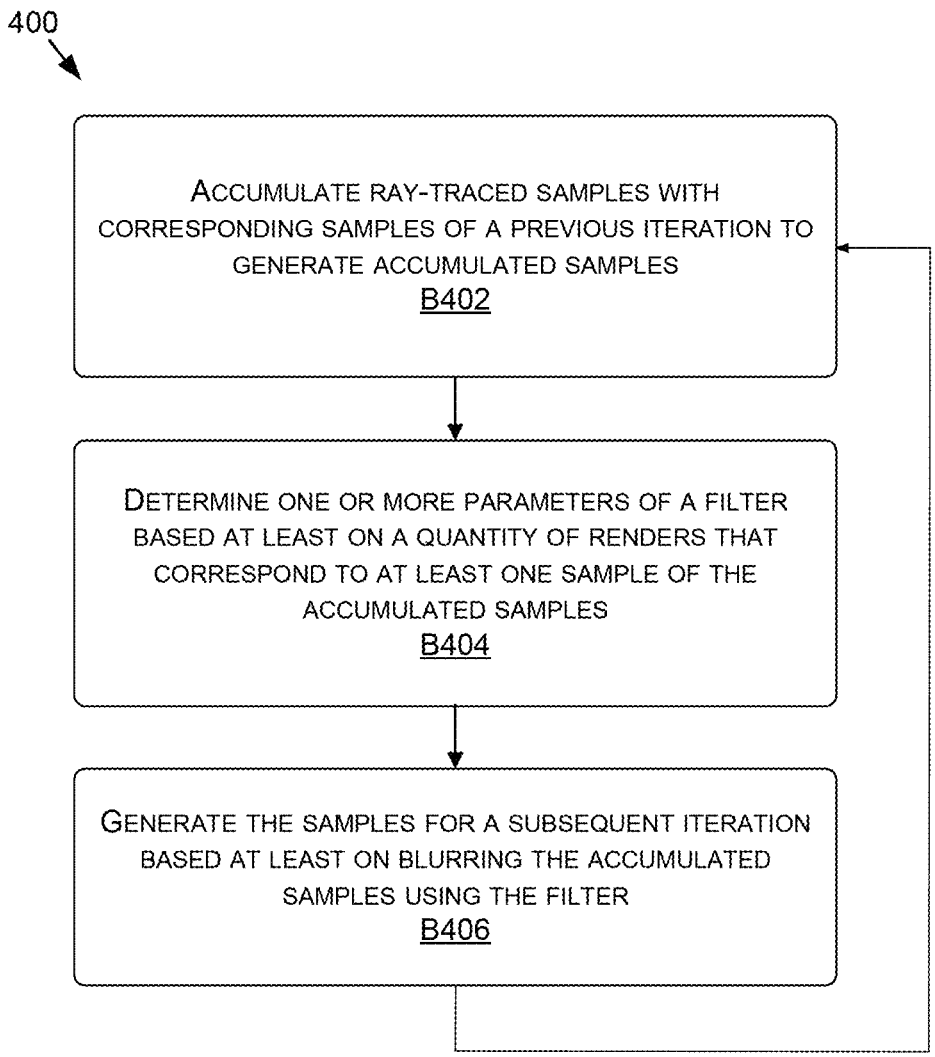
FIG. 4 is a flow diagram showing an example of a method for iteratively determining one or more parameters of a filter based at least on a quantity of renders of a virtual environment that correspond to an accumulated sample, in accordance with at least one embodiment of the present disclosure.
Figure 5:
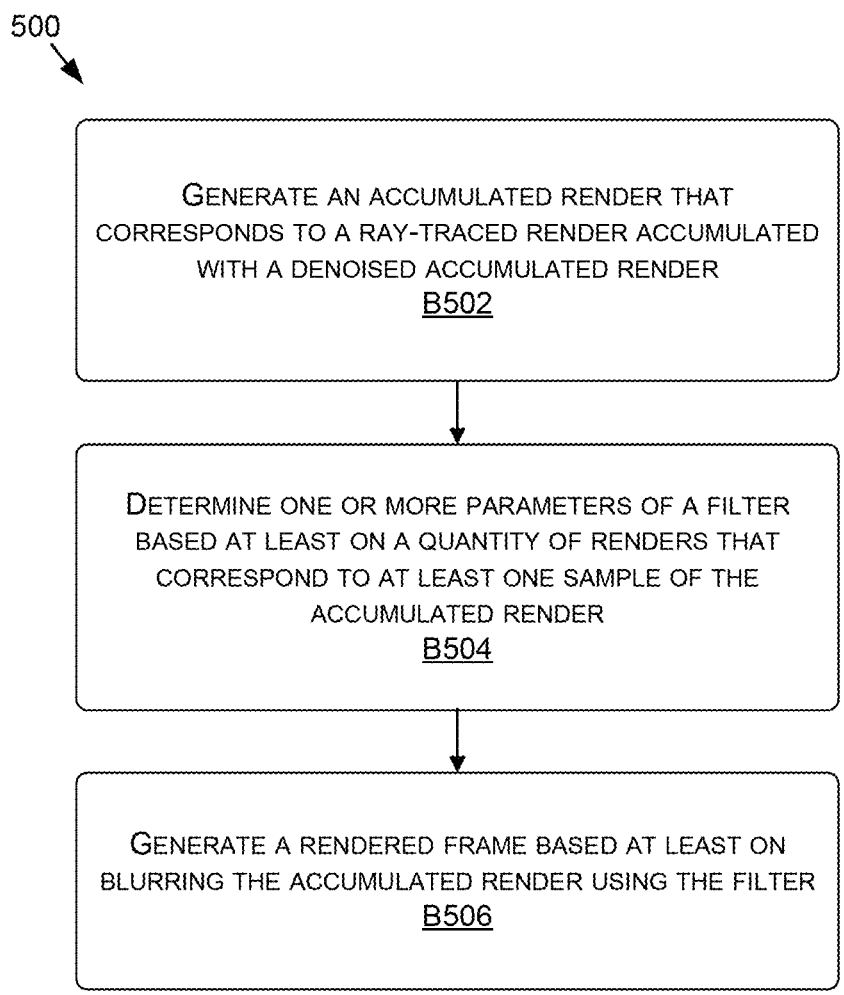
FIG. 5 is a flow diagram showing an example of a method for determining one or more parameters of a filter based at least on a quantity of renders of a virtual environment that correspond to at least one sample of an accumulated render, in accordance with at least one embodiment of the present disclosure.

Now referring to FIGS. 3-5, each block of methods 300, 400, and 500, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the systems components of FIG. 1. However, these methods may additionally or alternatively be executed by any one system, or any combination of systems, including, but not limited to, those described herein.

FIG. 3 is a flow diagram showing an example of a method 300 for determining one or more parameters of a filter based at least on a quantity of rendered frames of a virtual environment, in accordance with at least one embodiment of the present disclosure. The method 300, at block B302, includes accumulating a ray-traced sample with at least one sample generated based at least on denoising a first accumulated sample to generate a second accumulated sample. For example, the sample accumulator 104 may accumulate a ray-traced sample of a virtual environment from the image renderer 102 with at least one sample generated based at least on the denoiser 108 denoising a first accumulated sample of the virtual environment. The at least one sample may be provided by the feedback loop 140 from a prior iteration of the process 100 and the accumulating may generate a second accumulated sample to be provided to the denoiser 108 in the current iteration of the process 100.

At block B304, the method 300 includes determining one or more parameters of a filter based at least on a quantity of rendered frames that correspond to the second accumulated sample. For example, the filter determiner 106 may determine a blur radius of a filter based at least on a quantity of rendered frames (or samples) that correspond to the second accumulated sample.

At block B306, the method 300 includes generating a rendered frame based at least on blurring the second accumulated samples using the filter. For example, a rendered frame may be generated based at least on the denoiser 108 blurring the second accumulated sample using the filter having the blur radius.

Referring now to FIG. 4, FIG. 4 is a flow diagram showing an example of a method 400 for iteratively determining one or more parameters of a filter based at least on a quantity of renders of a virtual environment that correspond to an accumulated sample, in accordance with at least one embodiment of the present disclosure.

The method 400, at block B402, includes accumulating ray-traced samples with samples corresponding to samples of a previous iteration to generate accumulated samples. For example, the sample accumulator 104 may accumulate ray-traced samples of the virtual environment from the image renderer 102 with samples of a previous iteration of the process 100 (provided by the feedback loop 140) to generate accumulated samples for the current iteration of the process 100.

The method 400, at block B404 includes determining one or more parameters of a filter based at least on a quantity of renders that correspond to at least one sample of the accumulated samples. For example, the filter determiner 106 may determine a blur radius of a filter based at least on a quantity of the renders that correspond to at least one sample of the accumulated samples.

The method 400, at block B406 includes generating the samples for a subsequent iteration based at least on blurring the accumulated samples using the filter. For example, the samples for a subsequent iteration may be generated based at least on the denoiser 108 blurring the accumulated samples using the filter having the blur radius. In some examples, the samples may comprise an output of the denoiser 108. However, in at least one embodiment further processing may be performed after the blurring by the denoiser 108 to generate the samples.

Referring now to FIG. 5, FIG. 5 is a flow diagram showing an example of a method 500 for determining one or more parameters of a filter based at least on a quantity of renders of a virtual environment that correspond to at least one sample of an accumulated render, in accordance with at least one embodiment of the present disclosure.

The method 500, at block B502 includes generating an accumulated render that corresponds to a ray-traced render accumulated with a denoised accumulated render. For example, the sample accumulator 104 may generate an accumulated render that corresponds to a ray-traced render of a virtual environment from the image renderer 102 accumulated with a denoised accumulated render of the virtual environment generated using the denoiser 108 from a previous iteration of the process 100.

At block B504, the method 500 includes determining one or more parameters of a filter based at least on a quantity of renders that correspond to at least one sample of the accumulated render. For example, the filter determiner 106 may determine a blur radius of a filter based at least on a quantity of renders that correspond to at least one sample of the accumulated render.

At block B506, the method 500 includes generating a rendered frame based at least on blurring the accumulated render using the filter. For example, a rendered frame may be generated based at least on the denoiser 108 blurring the accumulated render using the filter having the blur radius.

Hierarchical History Reconstruction

Aspects of the disclosure may also provide for a hierarchical approach to account for rejections of accumulated samples with respect to pixels. Typically, when a temporally accumulated sample for a pixel gets rejected by the sample accumulator 104, —due to a disocclusion of the pixel in ray-tracing performed by the image renderer 102, for example—temporal accumulation for that pixel is reset. Thus, the effective sample count for the pixel may be reduced for a number of frames as temporal data is re-accumulated by the sample accumulator 104. This may result in artifacts in rendered frames, particularly when the number of rays per-pixel used by the image renderer 102 to sample a virtual environment for the pixel is low.

Disclosed approaches may supplement the effective number of rays per-pixel used to sample a virtual environment for a pixel based at least on a quantity of successfully accumulated frames that correspond to that pixel. Referring now to FIGS. 6A and 6B, FIG. 6B is a flow diagram showing a process 600A for denoising using recurrent blur that includes generating an augmented sample based at least on a quantity of renders of a virtual environment that correspond to a ray-traced sample in an accumulated render, in accordance with at least one embodiment of the present disclosure. FIG. 6B is a flow diagram showing a process 600B for denoising using pre-accumulation that includes generating an augmented sample based at least on a quantity of renders of a virtual environment that correspond to a ray-traced sample in an accumulated render, in accordance with at least one embodiment of the present disclosure.

In the process 600A and the process 600B, rather than the sample accumulator 104 using only the ray-traced sample(s) from a ray-traced render for accumulating for a pixel, ray-traced samples from a lower resolution version(s) of the ray-traced render may be used. At a high level, the process 600A may include the image renderer 102 generating one or more outputs, such as a ray-traced render of a virtual environment (e.g., a virtual environment 2200 of FIG. 22). The process 100 may also include the sample accumulator 104 receiving one or more inputs, such as the ray-traced render and a denoised accumulated render from a prior iteration of the process 600A, accumulating the input(s), and generating one or more outputs, such as an accumulated render.

The process 600A may further include a resolution manager receiving one or more inputs, such as the accumulated render and counts of quantities of samples accumulated to pixels of the accumulated render, and generating one or more outputs, such as one or more samples augmented with at least one sample that corresponds to a resolution level of the ray-traced render. The process 100 may further include the filter determiner 106 receiving one or more inputs, and generating one or more outputs, such as one or more parameters of one or more filters. The process 100 may further include the denoiser 108 receiving one or more inputs, such as the one or more parameters, and generating one or more outputs, such as the accumulated render denoised using the one or more filters.

The process 600B may be similar to the process 600A, except that the sample accumulator 104 may accumulate samples before a blur or denoising pass is performed on the accumulated samples.

Due to a rejection of accumulated data, a history buffer may not include any usable data for a pixel. Using disclosed approaches, the resolution manager 602 may use a coarse resolution (e.g., highest mipmap level) for the pixel in an iteration of the process 600A or 600B. The resolution manager 602 may incrementally increase the resolution each iteration in correspondence with the quantity of successfully accumulated frames and/or samples for the pixel (e.g., until a base level resolution is reached). Initially, the resolution manager 602 may use the corresponding composite sample for the pixel (e.g., along with the non-rejected accumulated samples for other pixels) in the history buffer so as to augment the accumulated data in a denoising iteration. After successful accumulation for the pixel, the resolution manager 602 may use the corresponding composite sample for the pixel in combination corresponding accumulated data in the history buffer for that pixel, so as to augment the accumulated data in a denoising iteration.

In various embodiments, the resolution manager 602 may compute the resolution level (e.g., a mipmap level) for one or more samples and/or pixels may be based at least on the quantity of successfully accumulated frames and may increase with the quantity of successfully accumulated frames or samples (e.g., until a base resolution of the ray-traced render is reached). For example, as described herein, the sample accumulator 104 may track the quantity of successfully accumulated frames or samples (e.g., per-pixel), which the resolution manager 602 may use to control, or adapt, the resolution of the ray-traced render from the image renderer 102. In at least one embodiment, the resolution manager 602 may additionally or alternatively use the surface roughness of a pixel to determine the resolution level for the pixel. For example, the resolution level may be computed such that the resolution decreases with increased surface roughness.

The resolution manager 602 may use one or more portions of a version of the ray-traced render at the resolution in combination with or in place of temporally accumulated data from the sample accumulator 104 (e.g., before or after one or more spatial filtering passes). This approach may be used in the recurrent blurring approach of the process 600A, which may or may not adapt denoising filter size based at least on the numbers of successfully accumulated frames (e.g., according to the process 100). It is also contemplated that these approaches may be implemented using other denoising strategies, such as post-accumulation or pre-accumulation. For example, the process 600B shows these approaches implemented for pre-accumulation.

Figure 7A:
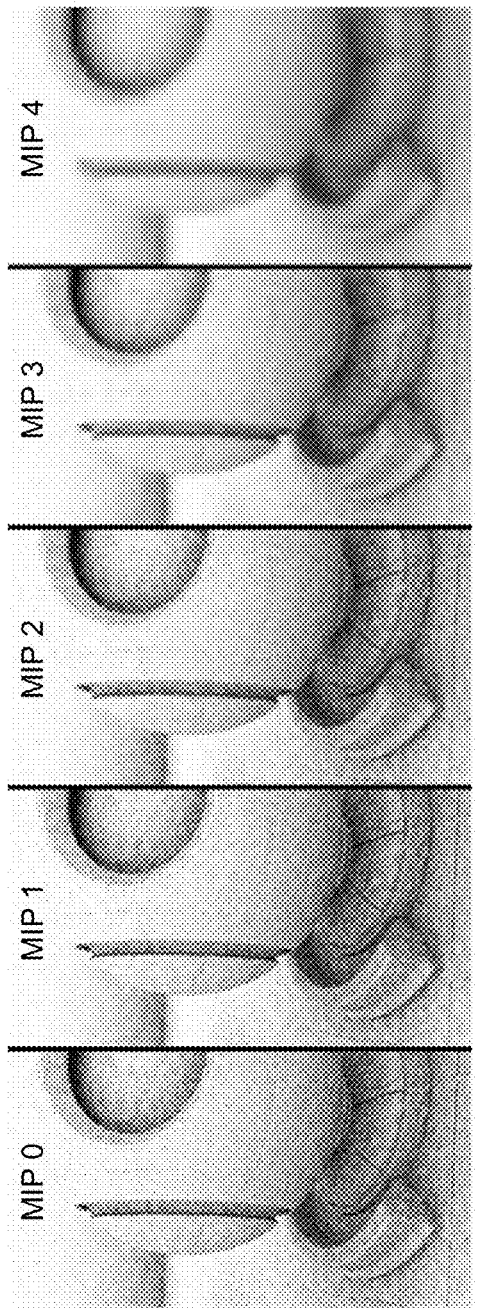
FIG. 7A shows an example of a render of a virtual environment at different mip levels, in accordance with at least one embodiment of the present disclosure.
Figure 7B:
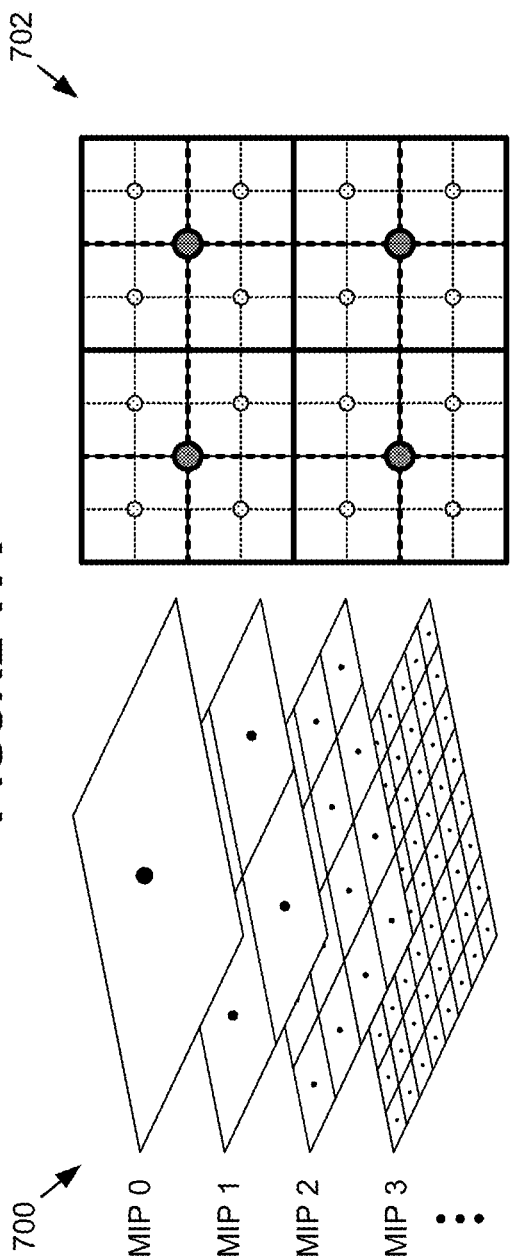
FIG. 7B shows examples of mipmap levels and an alignment between neighboring mipmap levels, in accordance with at least one embodiment of the present disclosure.

In at least one embodiment, versions of a render at different resolution levels may be implemented using one or more mipmaps, for example, as described with respect to FIGS. 7A and 7B. Referring now to FIGS. 7A and 7B, FIG. 7A shows an example of a render of a virtual environment at different mipmap levels, in accordance with at least one embodiment of the present disclosure. FIG. 7B shows examples of mipmap levels MIP 0 through MIP 4 and an alignment between neighboring mipmap levels, in accordance with at least one embodiment of the present disclosure.

For example, In FIGS. 7A and 7B, MIP 0 may refer to a base resolution of a ray-traced render, which may be output by the image renderer 102. As the mip level increases, the resolution of the render decreases. Stack 700 of FIG. 7B illustrates how the corresponding mipmaps can be visualized as a stack of overlaid images. An example of an alignment 702 between neighboring resolutions/mip levels is shown on the right. Any number of mipmap and/or resolution levels may be used in accordance with various embodiments of the disclosure. In at least one embodiment, mipmaps may be generated for radiance and viewZ (which may capture Z-coordinates of pixels in world-space), where a viewZ delta may be used to compute weights during upsampling.

In various embodiments, the resolution manager 602 may use a count of successfully accumulated frames or samples for a pixel(s) to compute an adjustment factor that is then used to compute the resolution level for that pixel(s). The count may be the same count described with respect to the process 100 and tracked by the sample accumulator 104, or may be a different count. The adjustment factor may correspond to, for example, a computed result of an equation or portion thereof that uses the count as a variable. The adjustment factor may be proportional to or otherwise related to the quantity of accumulated frames and/or samples and may be computed per-pixel.

By way of example, the mip level for a pixel may be computed using Equation (2):

$$\text{MaxLevel}*\text{roughness}*\max(1-\text{newCount}/N, 0), \quad (2)$$

where roughness may refer to a surface roughness value for a pixel, MaxLevel may refer to the mipmap level of the lowest resolution of the render (e.g., MIP 4 in FIG. 7A), and N may refer to a number of frames with active history reconstruction.

Using disclosed approaches, the resolution manager 602 may trade off resolution for rays per-pixel to increase the effective sample count for a pixel(s). Given, for example and without limitation, a base resolution at MIP or resolution level 0 that corresponds to one Ray Per-Pixel (RPP), at MIP 1 the resolution manager 602 may use a 2×2 pixel region of the render for a pixel to increase the effective sample count to 4 RPP. At MIP 2 the resolution manager 602 may use a 4×4 pixel region of the render for the pixel to increase the effective sample count to 16 RPP. At MIP 3 the resolution manager 602 may use an 8×8 pixel region of the render for the pixel to increase the effective sample count to 64 RPP. Further, at MIP 4 the resolution manager 602 may use a 16×16 pixel region of the render for the pixel to increase the effective sample count to 256 RPP.

The resolution manager 602 may downsample the ray-traced render for an iteration (e.g., by shrinking it in all directions dividing it by 2) to generate any number of different resolutions and corresponding samples may be applied to a base resolution pixel in the denoising iteration. In some embodiments, those samples may be upsampled (e.g., using bilinear, bilateral, or high order upsampling) or otherwise combined to generate a corresponding composite sample for the base resolution sample.

Figure 8B:
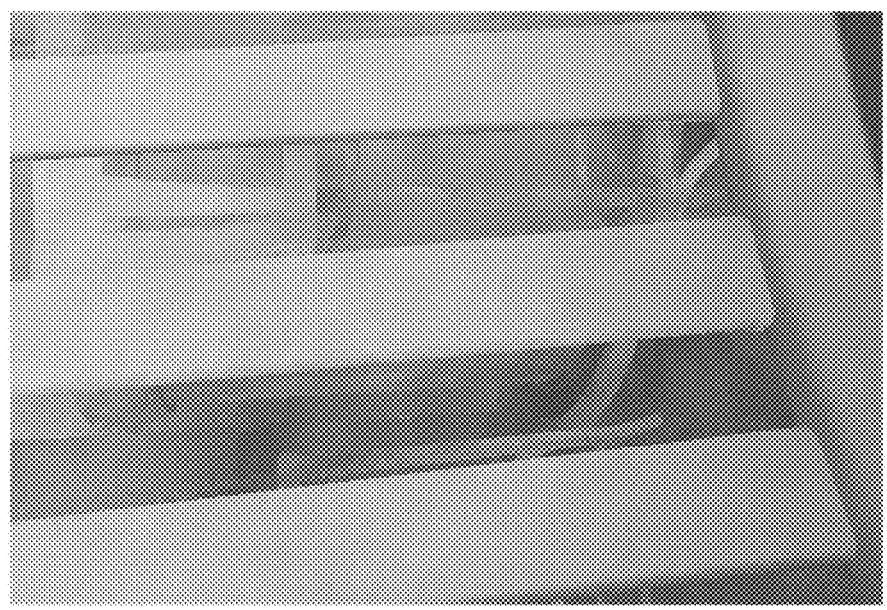
FIG. 8B shows an example render of a virtual environment which may be generated with augmenting accumulated samples, in accordance with at least one embodiment of the present disclosure.
Figure 8A:
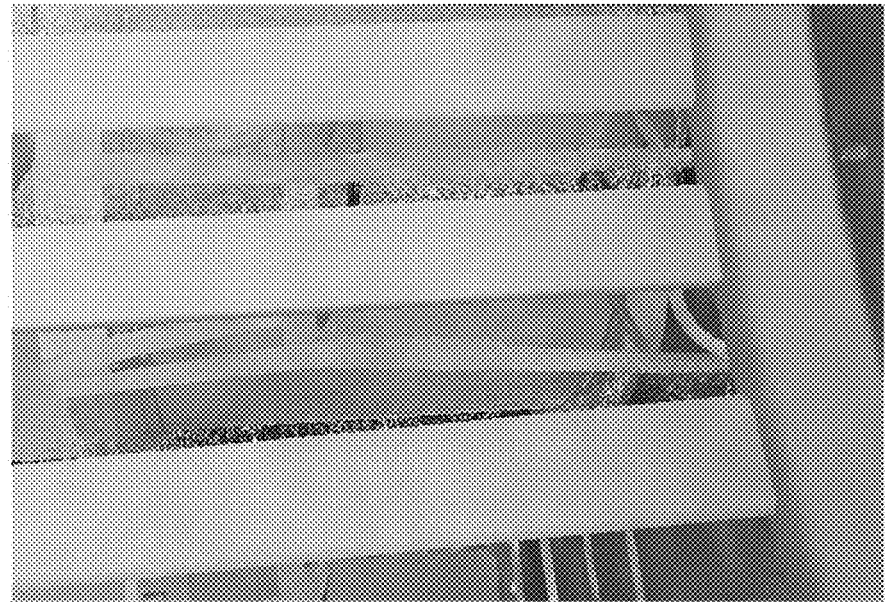
FIG. 8A shows an example render of a virtual environment which may be generated without augmenting accumulated samples, in accordance with at least one embodiment of the present disclosure.

Referring now to FIGS. 8A and 8B, FIG. 8A shows a render 800A of a virtual environment which may be generated without augmenting accumulated samples, in accordance with at least one embodiment of the present disclosure. FIG. 8B shows a render 800B of the virtual environment which may be generated with augmenting accumulated samples, in accordance with at least one embodiment of the present disclosure. For example, the render 800B may be generated using the process 600A or 600B.

Figure 9:
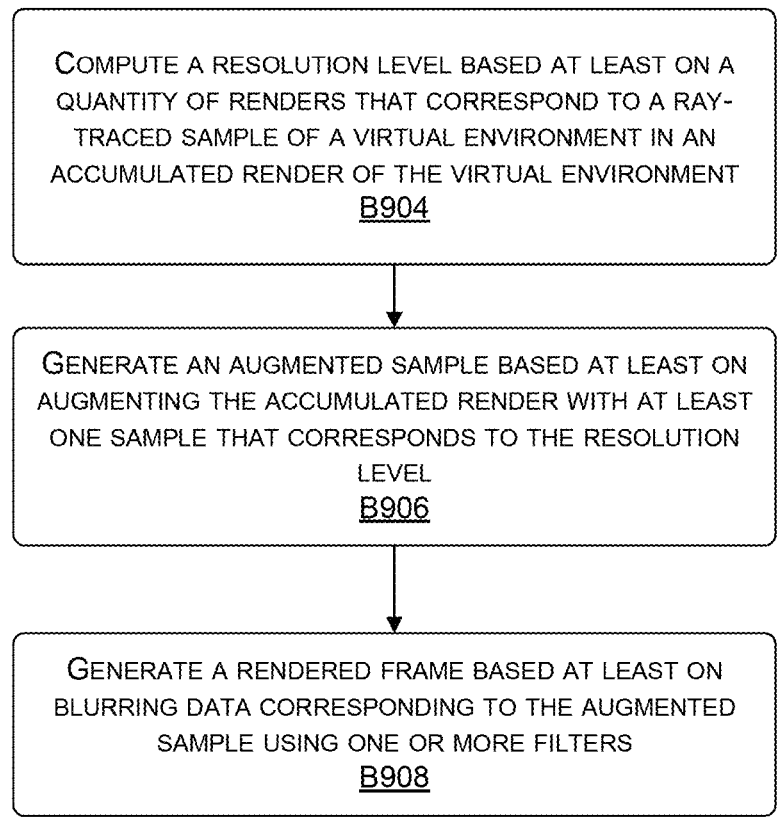
FIG. 9 is a flow diagram showing an example of a method for augmenting an accumulated render based at least on a quantity of renders that correspond to a ray-traced sample of a virtual environment in an accumulated render of the virtual environment, in accordance with at least one embodiment of the present disclosure.

Referring now to FIG. 9, FIG. 9 is a flow diagram showing an example of a method 900 for augmenting an accumulated render based at least on a quantity of renders that correspond to a ray-traced sample of a virtual environment in an accumulated render of the virtual environment, in accordance with at least one embodiment of the present disclosure. The method 900, at block B902 includes computing a resolution level based at least on a quantity of renders that correspond to a pixel of a ray-traced render in an accumulated render. For example, the resolution manager 602 may compute a resolution level (e.g., a mipmap level) based at least on a quantity of renders that correspond to a ray-traced sample of a virtual environment in an accumulated render of the virtual environment. The accumulated render may be generated using the sample accumulator 104.

At block B904, the method 900 includes generating a rendered frame based at least on augmenting the accumulated render with at least one sample that corresponds to the resolution level. For example, the resolution manager 602 may generate an augmented sample based at least on augmenting the accumulated render with at least one sample that corresponds to the resolution level and the ray-traced sample.

At block B906, the method 900 includes generating a rendered frame based at least on blurring data corresponding to the augmented sample using one or more filters. For example, a rendered frame may be generated based at least on the denoiser 108 blurring data corresponding to the augmented sample using one or more filters.

Figure 10:
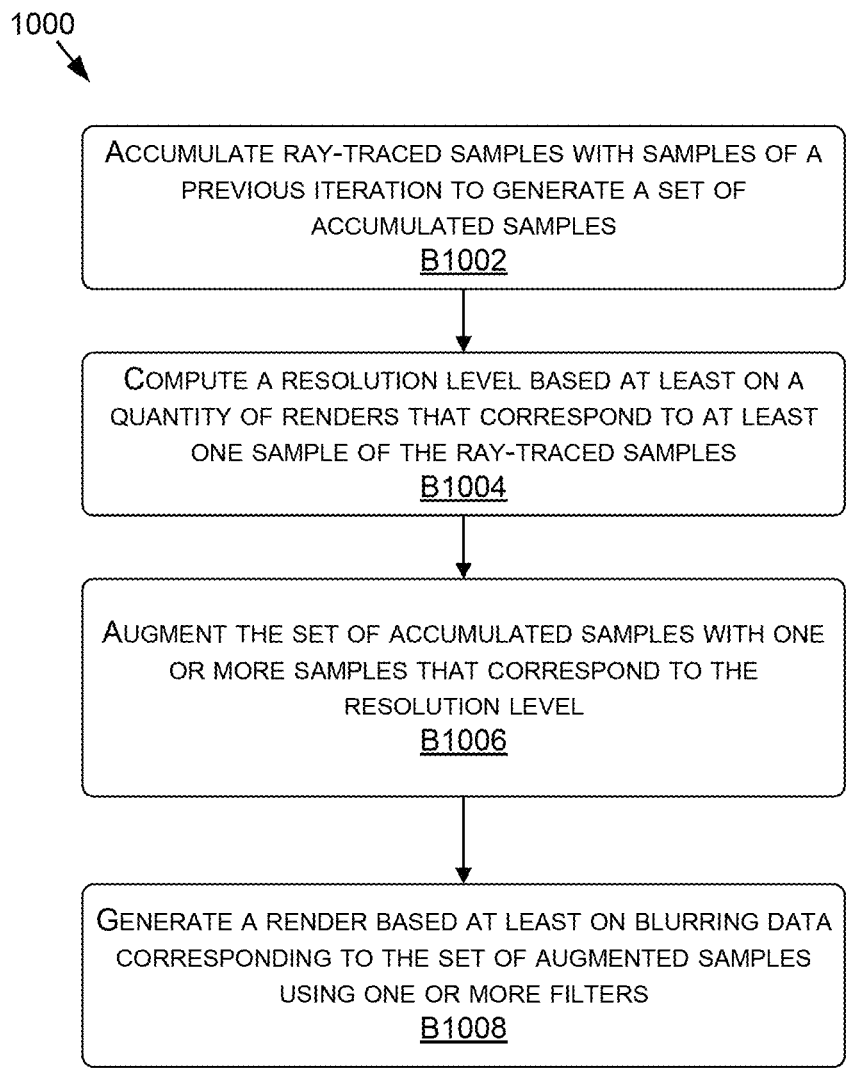
FIG. 10 is a flow diagram showing an example of a method for iteratively augmenting a set of accumulated samples based at least on a quantity of renders that correspond to at least one ray-traced sample of a virtual environment, in accordance with at least one embodiment of the present disclosure.

Referring now to FIG. 10, FIG. 10 is a flow diagram showing an example of a method 1000 for iteratively augmenting a set of accumulated samples based at least on a quantity of renders that correspond to at least one ray-traced sample of a virtual environment, in accordance with at least one embodiment of the present disclosure. The method 1000, at block B1002, includes accumulating ray-traced samples with samples of a previous iteration to generate a set of accumulated samples. For example, the sample accumulator 104 may accumulate ray-traced samples of the virtual environment from the image renderer 102 with samples of a previous iteration of a plurality of iterations, where the accumulating is to generate a set of accumulated samples.

At block B1004, the method 1000 includes computing a resolution level based at least on a quantity of renders that correspond to at least one sample of the ray-traced samples. For example, the resolution manager 602 may compute a resolution level based at least on a quantity of the renders that correspond to at least one sample of the ray-traced samples in the set of accumulated samples.

At block B1006, the method 1000 includes augmenting the set of accumulated samples with one or more samples that correspond to the resolution level. For example, the resolution manager 602 may augment the set of accumulated samples with one or more samples that correspond to the resolution level.

At block B1008, the method 1000 includes generating a render based at least on blurring data corresponding to the set of augmented samples using one or more filters. For example, a render may be generated based at least on the denoiser 108 blurring data corresponding to the set of accumulated samples that are augmented with the one or more samples using one or more filters.

Figure 11:
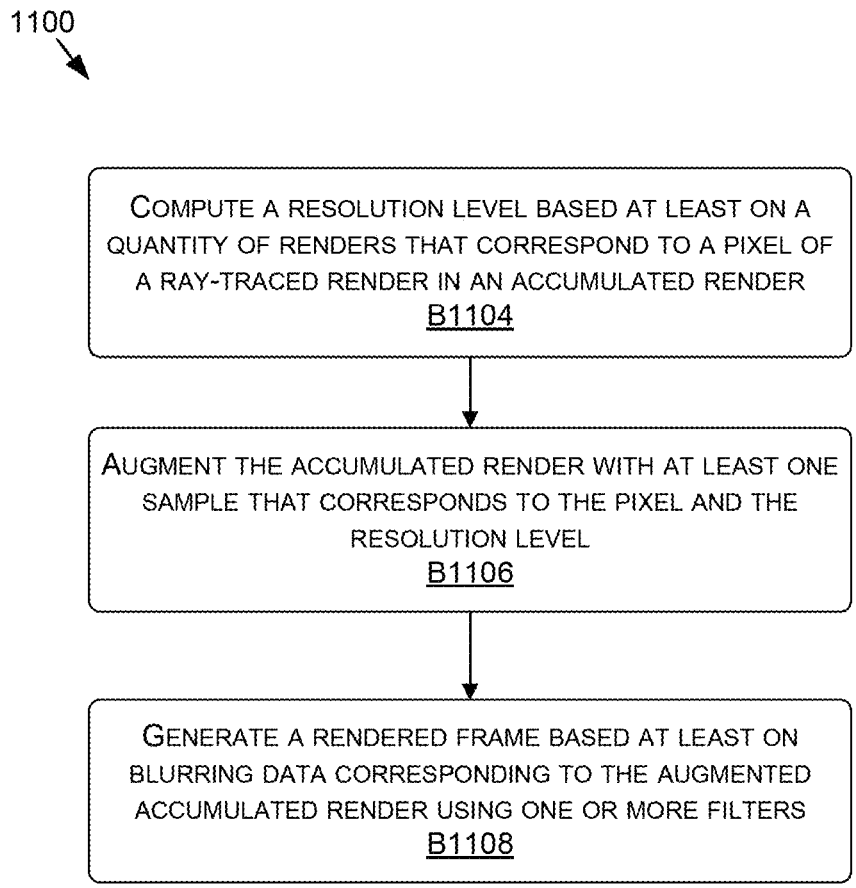
FIG. 11 is a flow diagram showing an example of a method for augmenting an accumulated render based at least on a quantity of renders that correspond to a pixel in an accumulated render of the virtual environment, in accordance with at least one embodiment of the present disclosure.

Referring now to FIG. 11, FIG. 11 is a flow diagram showing an example of a method 1100 for augmenting an accumulated render based at least on a quantity of renders that correspond to a pixel in an accumulated render of the virtual environment, in accordance with at least one embodiment of the present disclosure. The method 1100, at block B1102, includes computing a resolution level based at least on a quantity of renders that correspond to a pixel of a ray-traced render in an accumulated render. For example, the resolution manager 602 may compute a resolution level based at least on a quantity of renders that correspond to a pixel of a ray-traced render of a virtual environment generated using the image renderer 102 in an accumulated render of the virtual environment generated using the sample accumulator 104.

At block B1104, the method 1100 includes augmenting the accumulated render with at least one sample that corresponds to the pixel and the resolution level. For example, the resolution manager 602 may augment the accumulated render with at least one sample that corresponds to the pixel and the resolution level to generate an augmented accumulated render.

At block B1106, the method 1100 includes generating a rendered frame based at least on blurring data corresponding to the augmented accumulated render using one or more filters. For example, a rendered frame may be generated based at least on the denoiser 108 blurring data corresponding to the accumulated render that is augmented with the at least one sample using one or more filters.

Figure 12:
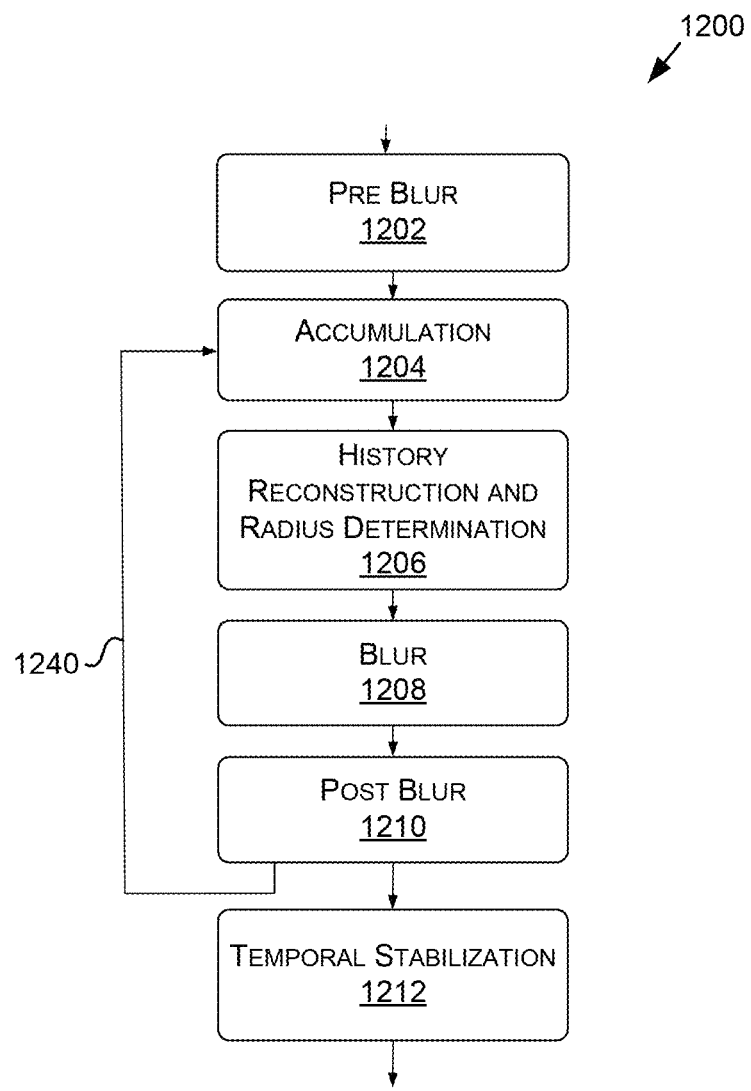
FIG. 12 is a data flow diagram illustrating an example process for denoising a render of a virtual environment, in accordance with at least one embodiment of the present disclosure.

Referring now to FIG. 12, FIG. 12 is a data flow diagram illustrating an example process 1200 for denoising a render of a virtual environment, in accordance with at least one embodiment of the present disclosure. The process 1200 may implement an adaptive blur radius in accordance with the process 100 and history reconstruction in accordance with the process 600A.

The process 1200 may be used for diffuse or specular input signals and uses recurrent blurring, by way of example. Further, as shown, pre blur 1202 and post blur 1210 may be included in the process 1200. By way of example, the pre blur 1202, the blur 1208, and the post blur 1210 may be based on Poisson-disk sampling, although other types may be used. The pre blur 1202 may use a constant filter size and the post blur 1210 may be adaptive. The post blur 1210 may also factor is the intensity of input signal after accumulation and the intensity of the signal after blurring. The filter determiner 106 may compare these values and the size (e.g., radius) of the filters may be based at least on the difference between these values. For example, the size may increase as a function of the difference, as a larger difference may indicate a lack of convergence.

The process 1200 may include one or more passes pre blur 1202 being applied to a ray-traced render of a virtual environment (e.g., from the image renderer 102). The pre blur may, for example, use a constant or adaptive radius filter and may be used to address outliers in the samples of the ray-traced render. The process 1200 may also include accumulation 1204 (e.g., using the sample accumulator 104) of the pre blurred ray-traced render with a denoised accumulated render from a feedback loop 1240. The accumulation 1204 may be performed, by way of example, using linear weights and may accumulate up to 32 or some other maximum number of frames.

The process 1200 may further include history reconstruction (e.g., using the resolution manager 602) and radius determination 1206 (e.g., using the filter determiner 106) from the accumulated data. This may include generation of the mipmaps and using the mipmaps to augment the accumulated samples (e.g., in the history buffer used for accumulation). In at least one embodiment, the mipmaps may be generated in a single pass in shared memory, for example, using averaging. The history reconstruction may be performed for each pixel that has discarded or otherwise insufficient accumulated sample data.

The process may also include blur 1202 of the augmented accumulated samples (e.g., using the denoiser 108). The blur 1202 may be based at least on the radius determination using one or more filters having corresponding radii. The process 1200 may additionally include post blur 1210 of the blurred and augmented accumulated samples (e.g., using the denoiser 108). The post blur 1210 may use the same radii determined for the blur 1202 or different radii. In at least one embodiment, a radius for a filter used by the post blur 1210 may be based at least on a quantity of rendered frames that correspond to a pixel and an intensity delta between the pixel and reprojected history from the history reconstruction. The process may also include temporal stabilization 1212 of the post blurred render, which may leverage Temporal Anti-Aliasing (TAA) with potentially wider variance clamping.

Denoising Filter Dimensions

Figures 13A, 13B:
FIG. 13A is a diagram illustrating an example of determining a blur plane for mirror reflections, in accordance with at least one embodiment of the present disclosure.
FIG. 13B is a diagram illustrating an example of determining a blur plane for diffuse signals, in accordance with at least one embodiment of the present disclosure.

Referring not to FIGS. 13A and 13B, FIG. 13A is a diagram illustrating an example of determining a blur plane 1302A for mirror reflections, in accordance with at least one embodiment of the present disclosure. FIG. 13B is a diagram illustrating an example of determining a blur plane 1302B for diffuse signals, in accordance with at least one embodiment of the present disclosure.

The approaches illustrated in FIGS. 13A and 13B may be used by the filter determiner 106 in at least one embodiment to determine blur planes for filters in world space. However, other approaches may be employed. As diffuse signals may cover the entire hemisphere of the sampling space, the blur plane 1302B for a point p may be in a tangent plane constructed around the plane normal N. For specular signals, at least for almost mirror reflections, the blur plane 1302A may be constructed in a plane perpendicular to the view vector V, where vector R in FIG. 13A may be a reflection of the inverse of the view vector V across the normal vector N of a surface 1306. This may in practice be very close to screen space, as illustrated by a screen plane 1304 in FIG. 13A.

Figure 14A:
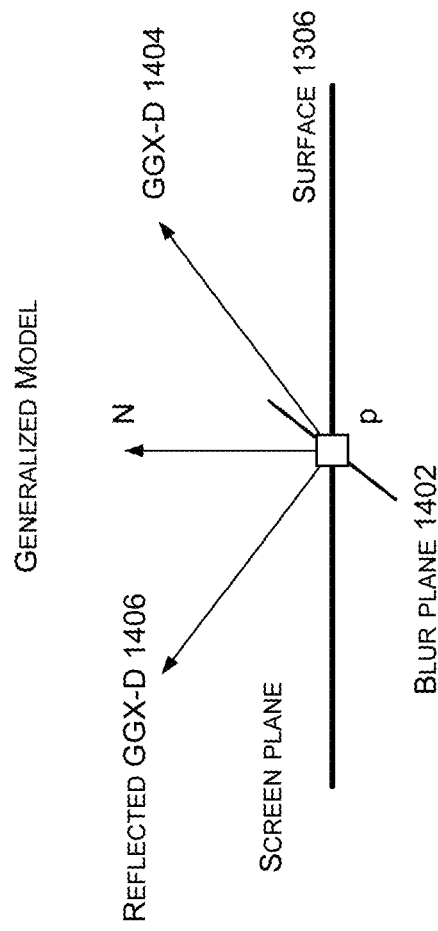
FIG. 14A is a diagram illustrating an example of determining a blur plane for denoising ray-traced samples, in accordance with at least one embodiment of the present disclosure.

In some embodiments, the blur plane may be based, at least in part, on a direction (e.g., dominant direction) of a specular lobe associated with the view vector and a corresponding surface normal, as further described with respect to FIG. 14A. FIG. 14A is a diagram illustrating an example of determining a blur plane 1402 for denoising ray-traced samples, in accordance with at least one embodiment of the present disclosure. The approach of FIG. 14A may, for example, for specular and/or diffuse signals.

FIG. 14A illustrates that the blur plane 1402 for a filter for point p (e.g., the kernel center in world space) may be based, at least in part, on a GGX NDF dominant direction 1404, although other types of NDFs may be employed in various embodiments. As an example, a direction of a specular lobe may be computed by trimming out values (e.g., random values) in NDF importance sampling, such as a Visible Normal Distribution Function (VNDF). The direction may be used, for example, to provide a generalized approach (e.g., compatible with both specular and diffuse signals) for defining the blur plane 1402 perpendicular to the view vector, and more particularly perpendicular to the reflected specular direction (e.g., dominant direction) 1406. In the case of a diffuse signal, the reflected specular direction 1406 may be the normal vector N if surface roughness of the surface 1306 is 0, and the reflected specular direction 1406 (a vector) around the normal is still the same normal vector N, so constructing a tangent plane for this case corresponds to a diffuse signal. The same approach may be used for almost mirror reflections.

Aspects of the disclosure may provide approaches to compute one or more dimensions of an anisotropic denoising filter (e.g., filter kernel) applied to a pixel when denoising a ray-traced render. For example, rather than applying a denoising filter to a pixel that is effectively isotropic in world space, the filter determiner 106 may determine a magnitude of one or more dimensions of the filter based at least on an angle of a view vector that corresponds to the pixel. This may be used to cause reflections to elongate along an axis under glancing angles, resulting in a more realistic render. The disclosure provides for computing an anisotropic filter kernel that may be elongated so that a size of the filter kernel extends farther along a first axis than along a second axis to more closely reflect the footprint of a BRDF lobe in a virtual environment. In various examples, the dimension(s) may also be based at least on the direction (e.g., dominant direction) of a reflected specular lobe associated with the view vector and a corresponding surface normal.

Figure 14B:
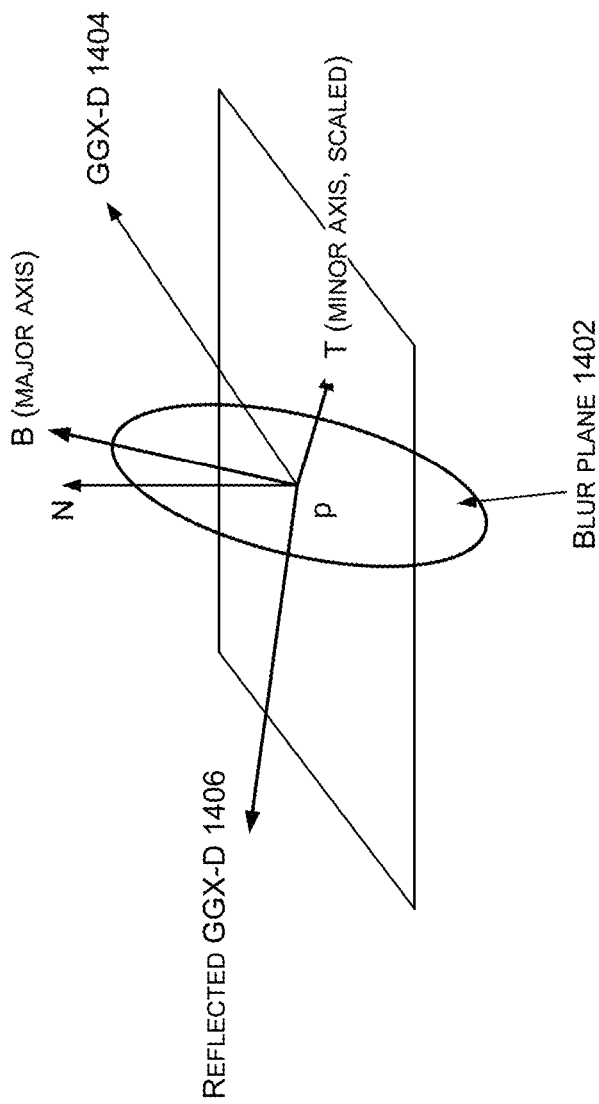
FIG. 14B is a diagram illustrating an example of determining an anisotropic filter for denoising ray-traced samples, in accordance with at least one embodiment of the present disclosure.

Referring now to FIG. 14B, FIG. 14B is a diagram illustrating an example of determining an anisotropic filter for denoising ray-traced samples, in accordance with at least one embodiment of the present disclosure. FIG. 14B illustrates an example in which an anisotropic filter may be based, at least in part, on the GGX NDF dominant direction 1404, although other types of NDFs may be employed in various embodiments. Under glancing angles, reflections elongate along some axis. Disclosed approaches may be used to determine how much and how long the effect should be and how to find such an axis.

As described herein, sampling may be defined on the blur plane 1402, which is perpendicular to the reflected specular direction (e.g., dominant direction) 1406. A resultant filter may be anisotropic in screen space and isotropic in world space. The filter determiner 106 may construct the basis of the filter around the reflected specular direction 1406 using tangent vector T and basis vector B to define filter directions and/or radii of the filter. Vectors T and B may have the same unit length when a generalized basis is employed. The tangent vector T may be computed from the normal vector N and the reflected specular direction 1406 (e.g., based at least on a normalized cross-product of the vectors). The basis vector B may be computed from the reflected specular direction 1406 and the tangent vector T (e.g., based at least on a cross-product of the vectors). The vectors T and B may define an isotropic filter basis. In order to simulate the effect of reflections under glancing angles, the tangent vector T may be scaled based at least on the viewing angle of the view vector V. In some embodiments, surface roughness of the point p may also be used as a scaling factor, as elongation does not happen for diffuse signals or specular signals as they approach diffuse signals due to the expansion of the hemisphere of the sampling space. In at least one embodiment, the tangent vector may be scaled and may be perpendicular to the surface normal such that the elongation happens along the surface normal.

Figure 15:
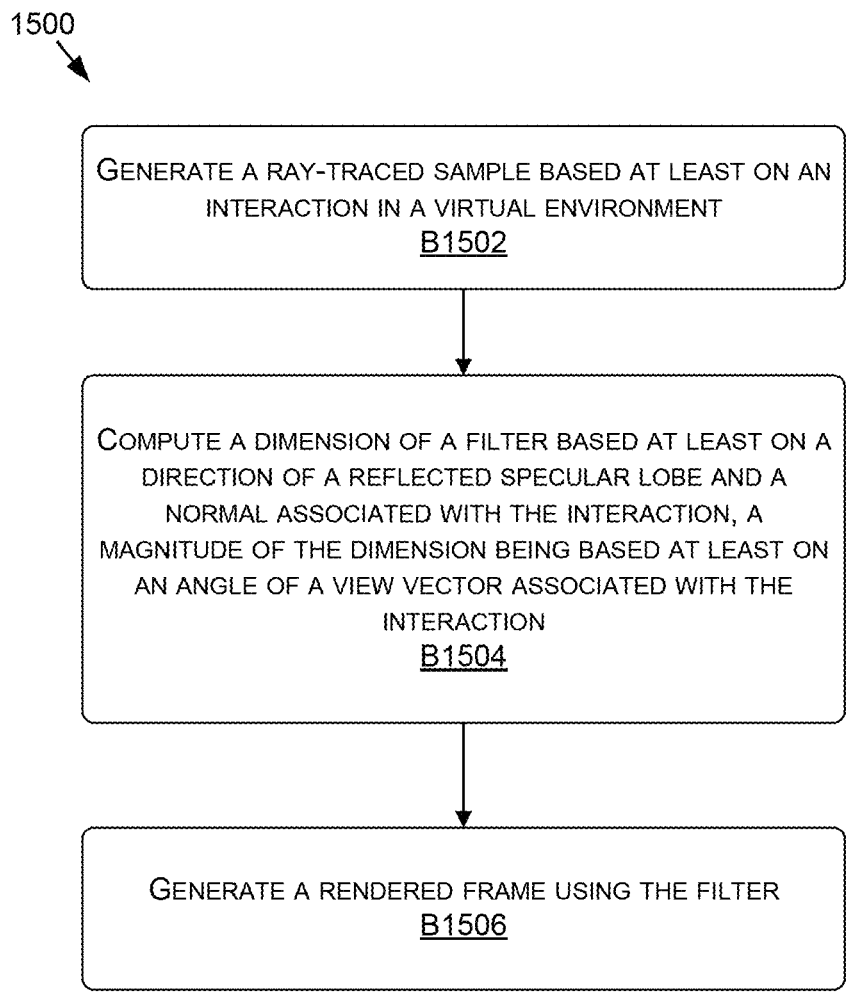
FIG. 15 is a flow diagram showing an example of a method for computing a dimension of a filter based at least on a direction of a reflected specular lobe, a normal, and an angle of a view vector, in accordance with at least one embodiment of the present disclosure.

Referring now to FIG. 15, FIG. 15 is a flow diagram showing an example of a method 1500 for computing a dimension of a filter based at least on a direction of a reflected specular lobe, a normal, and an angle of a view vector, in accordance with at least one embodiment of the present disclosure. The method 1500 at block B1502 includes generating a ray-traced sample based at least on an interaction in a virtual environment. For example, the image renderer 102 may generate at least one ray-traced sample based at least on an interaction between the view vector V and the point p in a virtual environment.

At block B1504, the method 1500 includes computing a dimension of a filter based at least on a direction of a reflected specular lobe of the interaction and a normal associated with the interaction, where a magnitude of the dimension is based at least on an angle of a view vector associated with the interaction. For example, the filter determiner 106 may compute a dimension of an anisotropic denoising filter (e.g., along the tangent vector T) based at least on the reflected specular direction of the interaction and the normal vector N that corresponds to the point p in the virtual environment, where a magnitude of the dimension is based at least on an angle of the view vector V.

At block B1506, the method 1500 includes generating a rendered frame using the filter. For example, a rendered frame may be generated based at least on the denoiser 108 applying the anisotropic denoising filter to data corresponding to the at least one ray-traced sample.

Figure 16:
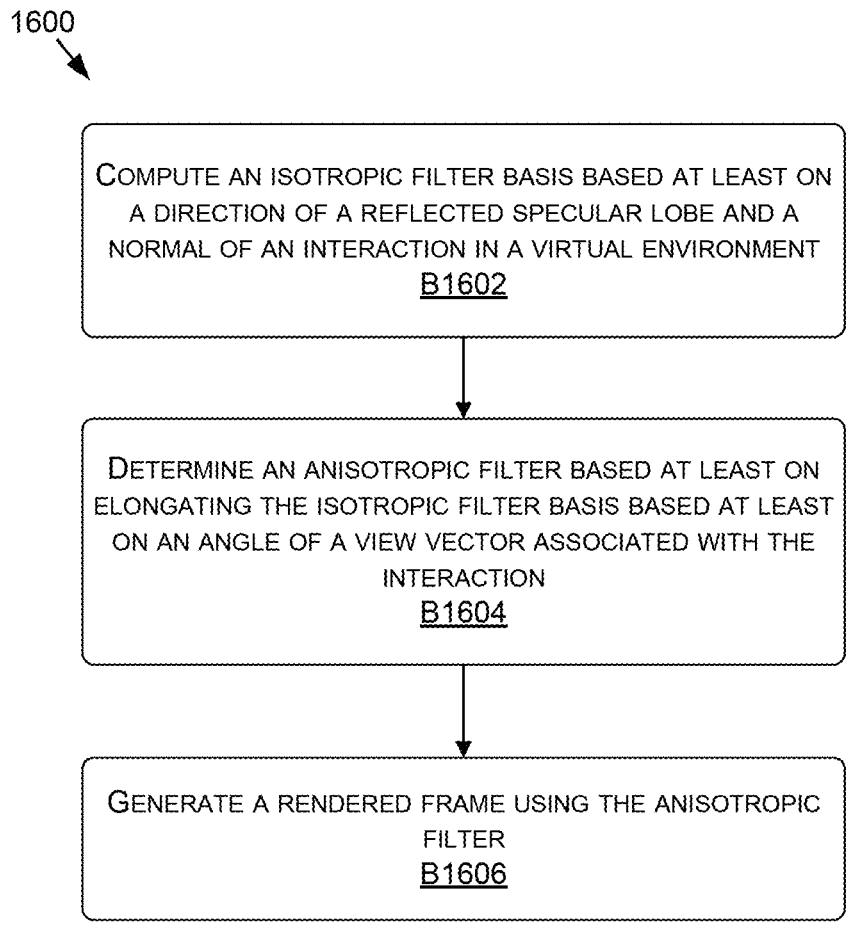
FIG. 16 is a flow diagram showing an example of a method for determining an anisotropic filter based at least on elongating an isotropic filter basis based at least on an angle of a view vector, in accordance with at least one embodiment of the present disclosure.

Referring now to FIG. 16, FIG. 16 is a flow diagram showing an example of a method 1600 for determining an anisotropic filter based at least on elongating an isotropic filter basis based at least on an angle of a view vector, in accordance with at least one embodiment of the present disclosure. The method 1600, at block B1602, includes computing an isotropic filter basis based at least on a direction of a reflected specular lobe and a normal of an interaction of a view vector in a virtual environment. For example, the filter determiner 106 may compute an isotropic filter basis (e.g., comprising the tangent vector T and the basis vector B) based at least on the reflected specular direction 1406 and the normal vector N of an interaction of the view vector V in a virtual environment.

At block B1604, the method 1600 includes determining an anisotropic filter based at least on elongating the isotropic filter basis based at least on an angle of the view vector associated with the interaction. For example, the filter determiner 106 may determine an anisotropic filter based at least on elongating the isotropic filter basis (e.g., the tangent vector T) based at least on an angle of the view vector V.

At block B1606, the method 1600 includes generating a rendered frame using the anisotropic filter. For example, a rendered frame of the virtual environment may be generated based at least on the denoiser 108 filtering render data corresponding to the interaction using the anisotropic filter.

Figure 17:
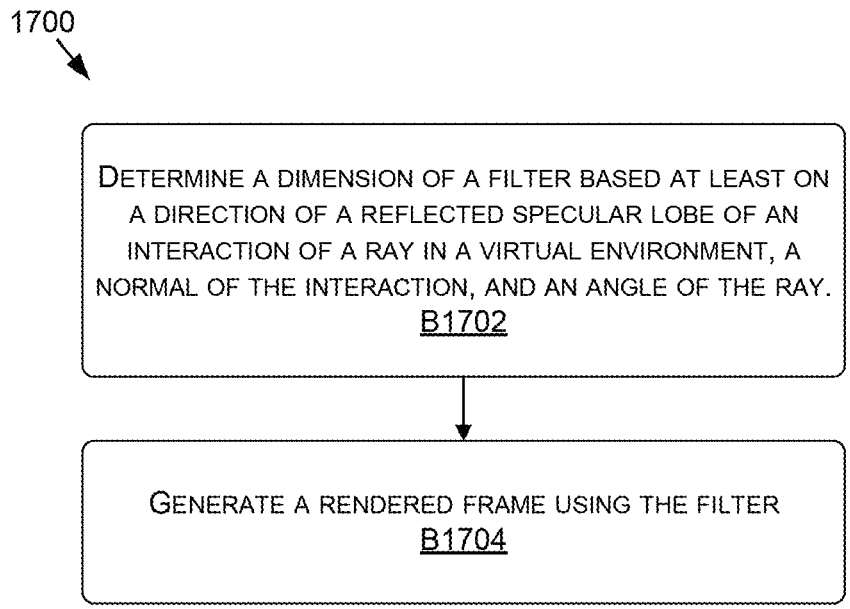
FIG. 17 is a flow diagram showing an example of a method for computing a dimension of a filter based at least on a direction of a reflected specular lobe, a normal, and an angle of a ray associated with an interaction, in accordance with at least one embodiment of the present disclosure.

Referring now to FIG. 17, FIG. 17 is a flow diagram showing an example of a method 1700 for computing a dimension of a filter based at least on a direction of a reflected specular lobe, a normal, and an angle of a ray associated with an interaction, in accordance with at least one embodiment of the present disclosure. The method 1700, at block B1702, includes determining a dimension of a filter based at least on a direction of a reflected specular lobe of an interaction of a ray in a virtual environment, a normal of the interaction, and an angle of the ray. For example, the filter determiner 106 may determine a dimension of a filter for the point p based at least on the reflected specular direction 1406 of an interaction of the view vector V in a virtual environment at the point p.

At block B1704, the method 1700 includes generating a rendered frame using the filter. For example, a rendered frame of the virtual environment may be generated based at least on the denoiser 108 blurring render data that corresponds to the interaction using the filter.

Accumulation Speed Based on Parallax

Aspects of the disclosure may provide for using parallax between frames or renders to control the accumulation speed of temporal accumulation (e.g., for specular accumulation). For example, surface motion may be used to reproject the specular history texture from a previous frame or render to a subsequent (e.g., current) frame or render. However, when light reflects off a surface, the motion of reflections may be different that surface motion, and therefore using only surface motion may result in artifacts in rendered frames. The accuracy of surface motion for a pixel may be based, at least in part on parallax between frames, and therefore may be used to control the impact of the surface motion in the temporal accumulation.

In various embodiments, parallax used to compute accumulation speed for a pixel may be based at least on an angle between view vectors that corresponds to the pixel. For example, parallax may correspond to an angle between previous and current view vectors for the same surface point(s). In at least one embodiment, parallax for a pixel may be computed as a ratio between a camera movement projection for the point(s) between renders or frames to the screen plane and a distance to the point(s). The accumulation speed may also be based at least on a viewing angle associated with the view vector of the ray-traced render, which may account for how parallax is perceived visually at different viewing angles. These approaches may be used in combination with recurrent blurring, post-accumulation, pre-accumulation, and/or other denoising strategies.

Figure 18:
FIG. 18 shows an example render of a virtual environment with view vectors that may be used to compute parallax, in accordance with at least one embodiment of the present disclosure.

Referring now to FIG. 18, FIG. 18 shows a render 1800 of a virtual environment with view vectors 1802A, 1802B, 1804A, and 1804B that may be used to compute parallax, in accordance with at least one embodiment of the present disclosure. In FIG. 18, the view vectors 1802A and 1802B are examples of view vectors for a current frame and/or rendered state of a virtual environment and the view vectors 1804A and 1804B are examples of view vectors for a prior frame and/or rendered state of the virtual environment. The view vectors 1802A and 1804A may be used to compute parallax for a corresponding pixel and the view vectors 1802B and 1804B may be used to compute parallax for a different corresponding pixel. In at least one embodiment, the parallax may be computed based at least on an angle between the current and previous view vectors (e.g., the view vectors 1802A and 1804A or the view vectors 1802B and 1804B). For example, parallax for a pixel may be computed at least in part as a ratio between a camera movement projection for point(s) between renders or frames to the screen plane and a distance to the point(s). Camera movement for the view vectors 1802A and 1804A may comprise a world-space vector between the corresponding camera positions 1810A and 1810B (as shown), which may be projected to the screen plane to determine the camera movement projection. In at least one embodiment, the viewZ coordinate of the pixel for the current frame may be used for the distance to the point(s).

In various embodiments, the sample accumulator 104 may compute the parallax in world space or in view space and the parallax may be applied to one or more corresponding pixels for determining accumulation speed. Parallax may be large for pixels close to the camera. For example, parallax may be larger for the pixel corresponding to the view vectors 1802A and 1804A, then for the pixel corresponding to the view vectors 1802B and 1804B. If parallax is small, the actual accumulation determined by the sample accumulator 104 is more or less correct based on surface motion. Thus, parallax may be used by the sample accumulator 104 to determine accumulation speeds used to accumulate for pixels.

In at least one embodiment, the sample accumulator 104 may determine the accumulation speed based at least on parallax and on a dot product between the current and previous view vectors (e.g., the view vectors 1802A and 1804A or the view vectors 1802B and 1804B). Surface roughness at the current point may also be a factor. If roughness is close to 1, reflections may get resolved into a diffuse signal, and the diffuse signal may always lie on the surface such that accumulation can be close to 100% with the history buffer. With respect to viewing angle, when a surface is viewed at a glancing angle, a view is most sensitive to parallax. When viewed from above at the surface, the view vector is perpendicular to the surface and the effect of parallax will be reduced. As such, viewing angle may be used as measure of sensitivity for the parallax.

Figure 19:
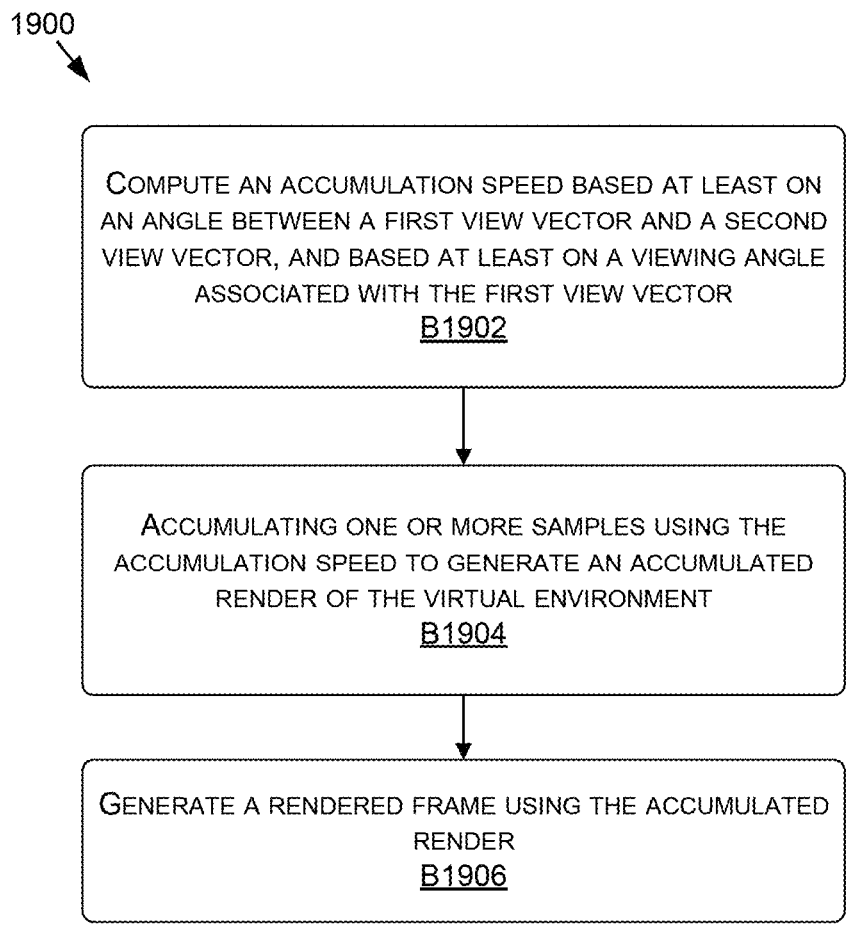
FIG. 19 is a flow diagram showing an example of a method for computing an accumulation speed based at least on an angle between view vectors and a viewing angle associated with a view vector, in accordance with at least one embodiment of the present disclosure.

Referring now to FIG. 19, FIG. 19 is a flow diagram showing an example of a method 1900 for computing an accumulation speed based at least on an angle between view vectors and a viewing angle associated with a view vector, in accordance with at least one embodiment of the present disclosure. The method 1900, at block B1902, includes computing an accumulation based at least on an angle between a first view vector and a second view vector, and based at least on a viewing angle associated with the first view vector. For example, the sample accumulator 104 may compute an accumulation speed for at least one pixel based at least on an angle between the view vector 1802A that corresponds to the at least one pixel and the view vector 1804A that corresponds to the at least one pixel, and based at least on a viewing angle associated with the view vector 1802A. The view vector 1802A may be used the image renderer 102 to generate a first ray-traced render of a virtual environment and the view vector 1804A may be used by the image renderer 102 to generate a second ray-traced render of the virtual environment.

At block B1904, the method 1900 includes accumulating one or more samples using the accumulation speed to generate an accumulated render of the virtual environment. For example, the sample accumulator 104 may accumulate one or more samples with a first accumulated render of the virtual environment using the accumulation speed for the at least one pixel to generate a second accumulated render of the virtual environment.

At block B1906, the method 1900 includes generating a rendered frame using the accumulated render. For example, a rendered frame may be generated using the second accumulated render.

Figure 20:
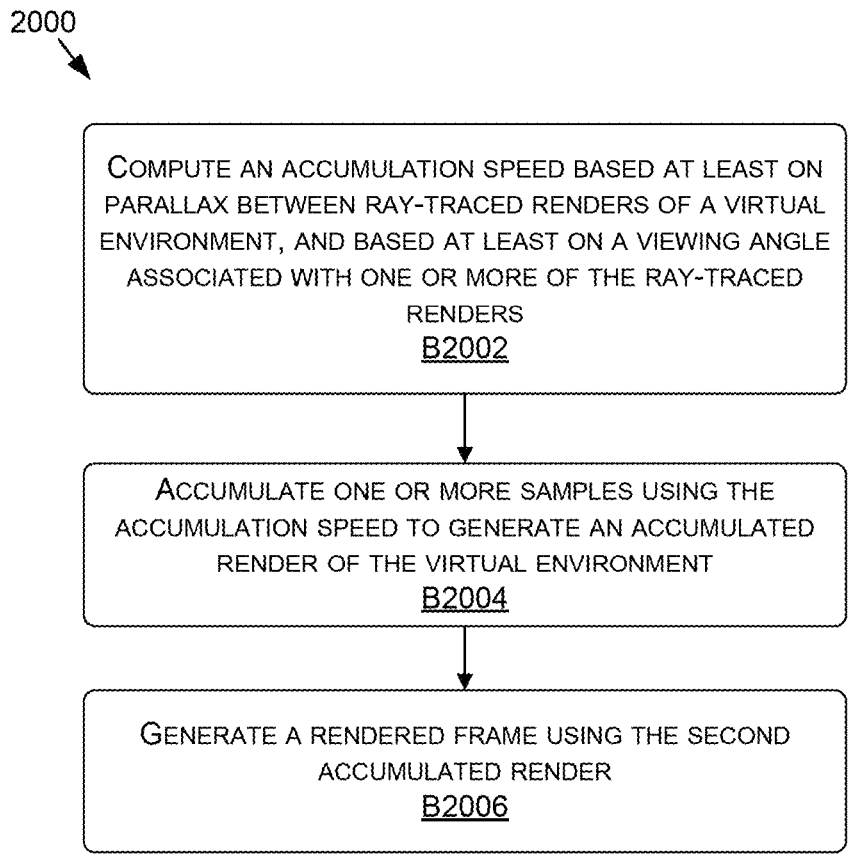
FIG. 20 is a flow diagram showing an example of a method for accumulating ray-traced renders using accumulation speeds based at least on parallax between views and viewing angles captured by the ray-traced renders, in accordance with at least one embodiment of the present disclosure.

Referring now to FIG. 20, FIG. 20 is a flow diagram showing an example of a method 2000 for accumulating ray-traced renders using accumulation speeds based at least on parallax between views and viewing angles captured by the ray-traced renders, in accordance with at least one embodiment of the present disclosure. The method 2000, at block B2002, includes computing an accumulation speed based at least on parallax between ray-traced renders of a virtual environment, and based at least on a viewing angle associated with one or more of the ray-traced renders. For example, the sample accumulator 104 may compute an accumulation speed based at least on parallax between ray-traced renders of a virtual environment, and based at least on a viewing angle (e.g., of the view vector 1802A and/or 1802B) associated with one or more of the ray-traced renders.

At block B2004, the method 2000 includes accumulating one or more samples using the accumulation speed to generate an accumulated render of the virtual environment. For example, the sample accumulator 104 may accumulate one or more samples to a first accumulated render of the virtual environment using the accumulation speed to generate a second accumulated render of the virtual environment.

At block B2006, the method 2000 includes generating a rendered frame using the second accumulated render.

Figure 21:
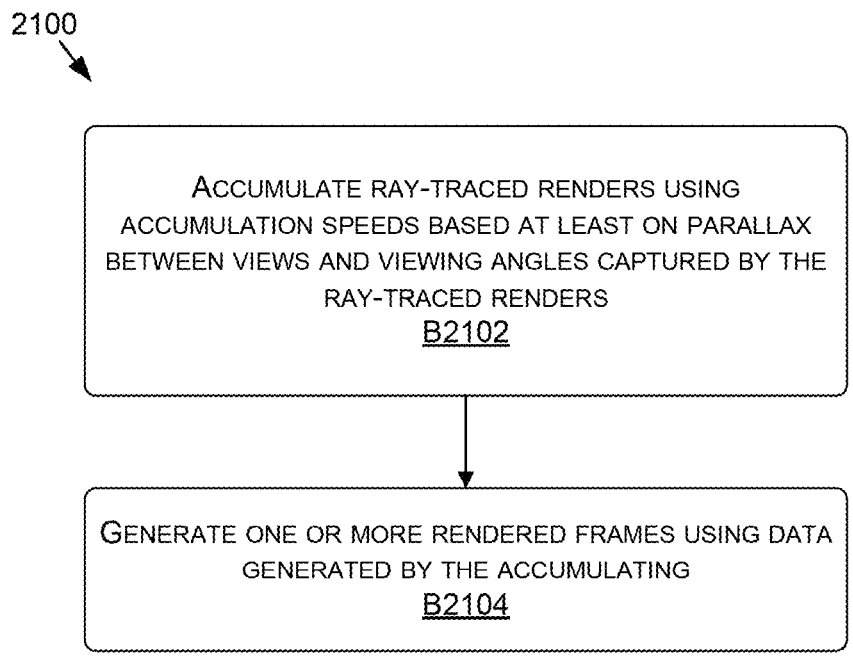
FIG. 21 is a flow diagram showing an example of a method for computing an accumulation speed based at least on parallax between renders and a viewing angle associated with one or more of the renders, in accordance with at least one embodiment of the present disclosure.

Referring now to FIG. 21, FIG. 21 is a flow diagram showing an example of a method 2100 for computing an accumulation speed based at least on parallax between renders and a viewing angle associated with one or more of the renders, in accordance with at least one embodiment of the present disclosure. The method 2100, at block B2102, includes accumulating ray-traced renders using accumulation speeds based at least on parallax between views and viewing angles captured by the ray-traced renders. For example, the sample accumulator 104 may accumulate ray-traced renders of a virtual environment using accumulation speeds for pixels based at least on parallax between views of the virtual environment represented by the ray-traced renders and viewing angles of the virtual environment captured by the ray-traced renders.

At block B2104, the method 2100 includes generating one or more renderer frames using data generated by the accumulating.

Examples of Ray-Tracing Techniques

Referring now to FIG. 22, FIG. 22 is a diagram used to illustrate examples of ray-tracing techniques which the image renderer 102 may use to generate ray-traced renders, in accordance with some embodiments of the present disclosure. FIG. 22 shows a virtual environment 2200 including a camera 2202, a screen 2204, an object 2206, and a surface 2208.

The screen 2204 may be a virtual representation of a screen which may or more not be the same resolution as rendered frames or intermediate images or renders described herein. The screen 2204 may include a matrix of virtual pixels or regions, of which a pixel 2212 is individually labeled. To determine at least some lighting condition data for the pixel 2212, the image renderer 102 may cast any number of rays (e.g., one or more) —such as a ray 2214— through the pixel 2212 of the screen 2204 to sample lighting conditions for the pixel 2212. These rays may be referred to as camera rays, eye rays, incident rays, view vectors, or primary rays, as examples.

The image renderer 102 may use the camera rays to determine visible points in the environment which may be affected by the object 2206 and/or at least one light source. For example, the image renderer 102 may use the ray 2214 to determine a point 2216 (e.g., the point p) on or near the surface 2208. This may include the image renderer determining the point 2216 as the location where the ray 2214 intersects with the surface 2208 (or the point 2216 may otherwise be based at least on that location). Although the ray 2214 intersects with the surface 2208, in examples where more than one ray is cast, not all rays may intersect with a surface.

From each point in the virtual environment 2200 that the image renderer 102 determines using a ray cast through the pixel 2212, any number of rays (e.g., one or more) —such as a ray 2218—may be cast to model a reflection of the ray 2214 at the point 2216. The image renderer 102 may determine the direction of the ray 2218 based at least on a normal of the surface 2208 at the point 2216. For example, the image renderer may define the NDF range 2220 for the point 2216 based at least on the normal of the surface 2208 at the point 2216. The image renderer 102 may use the NDF, the ray 2214, and a roughness value of the surface 2208 that is associated with the point 2216 to define the BRDF (e.g., using a glossy microfacet BRDF model). For example, the NDF range 2220 may be defined using a function (the NDF) that defines a likelihood of a microfacet being aligned in a particular direction.

The BRDF lobe may be defined using a function (the BRDF) that uses the NDF as a weighting function to scale the brightness of reflections. The image renderer 102 may sample the BRDF lobe (e.g., stochastically using the BRDF or using another sampling strategy) to determine the ray 2218. These rays may be referred to as reflected rays, or secondary rays, as examples. Although the ray 2218 intersects with the object 2206, in examples where more than one ray is cast, not all rays may intersect with the object 2206. For example, a ray may intersect with a different object or may not intersect with any object. In some embodiments, one or more additional rays may be cast to determine lighting conditions for the pixel 2212, such as based on an interaction of the ray 2218 with the object 2206, and similar operations may be performed with respect to a point of that interaction.

The various rays (e.g., the ray 2214, the ray 2218, etc.) may be used by the image renderer 102 to determine ray-traced samples of lighting conditions for the pixel 2212. For example, the rays may form any number of virtual light paths between the pixel 2212 and one or more light sources, any number of examples of which may include the ray 2214 and the ray 2218. The object 2206 may be an example of such a light source, or the object 2206 may be another type of object, such as a non-light emitting reflective object. Where the object 2206 is not a light source, the virtual light path may further include one or more rays to a light source. The image renderer may determine at least some lighting condition data for the pixel 2212 by combining (e.g., averaging) the lighting condition data derived from the various ray-traced samples. The image renderer may similarly determine at least some lighting condition data for each pixel or region of the screen 2204 (e.g., using any number of shadow rays, camera rays, and/or other ray types) in order to generate a ray-traced render of the virtual environment 2200.

As described herein, aspects of the disclosure provide approaches for the filter determiner 108 determining the size, shape, orientation, filter directions, and/or filter weights of a filter kernel that is applied to a pixel(s) to denoise the ray-traced samples of a graphically-rendered image. A size, orientation, and/or shape of a filter kernel and corresponding filter weights of the filter may be determined and/or adjusted based on various information described herein, such as temporal ray-traced sample information from preceding frames and/or image render data used by the image renderer to render an output and/or final frame or render. Examples include radiance data (e.g., specular or diffuse), hit distance data, scene depth data, and world normals. Various types of filters are contemplated as being within the scope of the disclosure including Poisson disk-based filters, Poisson-based filters, uniform jitter-based filters, bilateral filters, cross-bilateral filters, spatiotemporal filters, temporal filters, spatial filters, etc. Various numbers of samples may be used for a filter, an example of which includes eight. Suitable footprints for filters may include rectangular, square, round, elliptical, etc.

In various examples, the filter determiner 108 may determine one or more filter dimensions of a filter based at least on the ray 2214, which may or may not have been used by the image renderer to sample lighting conditions for the pixel 2212 (e.g., to determine corresponding image data). In some examples, the image renderer 102 uses at least one ray-traced sample of at least one previous state of the virtual environment 2200 (e.g., each state may correspond to a rendered frame representative of the virtual environment 2200) to determine lighting conditions for the pixel 2212 at a subsequent state(s) of the virtual environment. For example, any number of temporal ray-traced samples may be used to determine lighting conditions for the pixel 2212 in addition to the one or more spatial or current ray-traced samples used to determine the lighting conditions for the pixel 2212 (e.g., using an accumulation or history buffer). Where a number of temporal ray-traced samples are used, those samples may be counted (e.g., per-pixel) or may otherwise be used to reduce the size and/or one or more geometries of the filter.

Using some approaches described herein, at grazing angles the filter may be stretched along with the reflection itself, and in a region where the ray 2214 is more perpendicular to the surface 2208, the filter may become less elongated because it may more closely correspond to the BRDF lobe at the point 2216.

Example Computing Device

Figure 23:
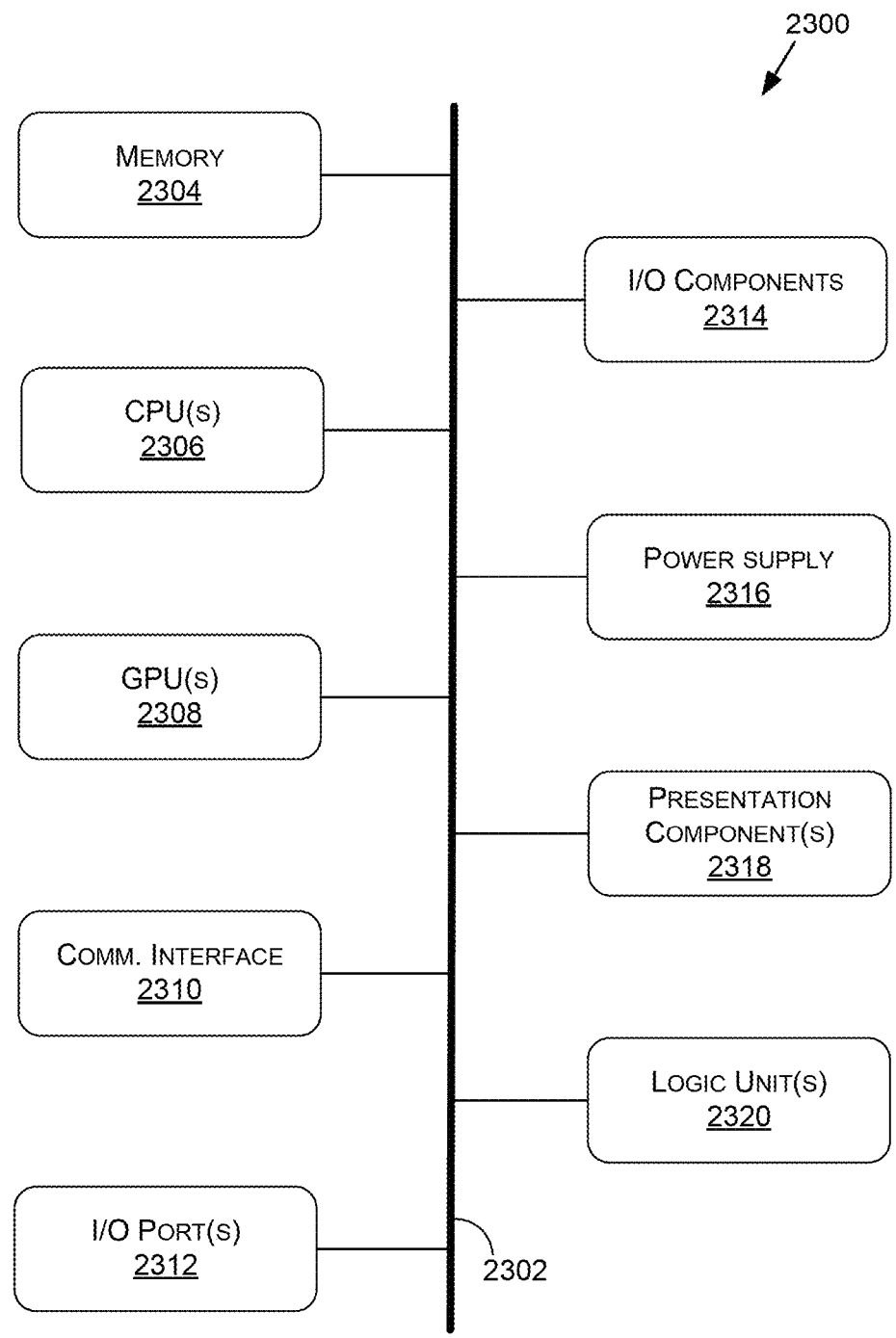
FIG. 23 is a block diagram of an example computing device suitable for use in implementing some embodiments of the present disclosure.

FIG. 23 is a block diagram of an example computing device(s) 2300 suitable for use in implementing some embodiments of the present disclosure. Computing device 2300 may include an interconnect system 2302 that directly or indirectly couples the following devices: memory 2304, one or more central processing units (CPUs) 2306, one or more graphics processing units (GPUs) 2308, a communication interface 2310, input/output (I/O) ports 2312, input/output components 2314, a power supply 2316, one or more presentation components 2318 (e.g., display(s)), and one or more logic units 2320. In at least one embodiment, the computing device(s) 2300 may comprise one or more virtual machines (VMs), and/or any of the components thereof may comprise virtual components (e.g., virtual hardware components). For non-limiting examples, one or more of the GPUs 2308 may comprise one or more vGPUs, one or more of the CPUs 2306 may comprise one or more vCPUs, and/or one or more of the logic units 2320 may comprise one or more virtual logic units. As such, a computing device(s) 2300 may include discrete components (e.g., a full GPU dedicated to the computing device 2300), virtual components (e.g., a portion of a GPU dedicated to the computing device 2300), or a combination thereof.

Although the various blocks of FIG. 23 are shown as connected via the interconnect system 2302 with lines, this is not intended to be limiting and is for clarity only. For example, in some embodiments, a presentation component 2318, such as a display device, may be considered an I/O component 2314 (e.g., if the display is a touch screen). As another example, the CPUs 2306 and/or GPUs 2308 may include memory (e.g., the memory 2304 may be representative of a storage device in addition to the memory of the GPUs 2308, the CPUs 2306, and/or other components). In other words, the computing device of FIG. 23 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 23.

The interconnect system 2302 may represent one or more links or busses, such as an address bus, a data bus, a control bus, or a combination thereof. The interconnect system 2302 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 2306 may be directly connected to the memory 2304. Further, the CPU 2306 may be directly connected to the GPU 2308. Where there is direct, or point-to-point connection between components, the interconnect system 2302 may include a PCIe link to carry out the connection. In these examples, a PCI bus need not be included in the computing device 2300.

The memory 2304 may include any of a variety of computer-readable media. The computer-readable media may be any available media that may be accessed by the computing device 2300. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 2304 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 2300. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 2306 may be configured to execute at least some of the computer-readable instructions to control one or more components of the computing device 2300 to perform one or more of the methods and/or processes described herein. The CPU(s) 2306 may each include one or more cores (e.g., one, two, four, eight, twenty-eight, seventy-two, etc.) that are capable of handling a multitude of software threads simultaneously. The CPU(s) 2306 may include any type of processor, and may include different types of processors depending on the type of computing device 2300 implemented (e.g., processors with fewer cores for mobile devices and processors with more cores for servers). For example, depending on the type of computing device 2300, the processor may be an Advanced RISC Machines (ARM) processor implemented using Reduced Instruction Set Computing (RISC) or an x86 processor implemented using Complex Instruction Set Computing (CISC). The computing device 2300 may include one or more CPUs 2306 in addition to one or more microprocessors or supplementary co-processors, such as math co-processors.

In addition to or alternatively from the CPU(s) 2306, the GPU(s) 2308 may be configured to execute at least some of the computer-readable instructions to control one or more components of the computing device 2300 to perform one or more of the methods and/or processes described herein. One or more of the GPU(s) 2308 may be an integrated GPU (e.g., with one or more of the CPU(s) 2306 and/or one or more of the GPU(s) 2308 may be a discrete GPU. In embodiments, one or more of the GPU(s) 2308 may be a coprocessor of one or more of the CPU(s) 2306. The GPU(s) 2308 may be used by the computing device 2300 to render graphics (e.g., 3D graphics) or perform general purpose computations. For example, the GPU(s) 2308 may be used for General-Purpose computing on GPUs (GPGPU). The GPU(s) 2308 may include hundreds or thousands of cores that are capable of handling hundreds or thousands of software threads simultaneously. The GPU(s) 2308 may generate pixel data for output images in response to rendering commands (e.g., rendering commands from the CPU(s) 2306 received via a host interface). The GPU(s) 2308 may include graphics memory, such as display memory, for storing pixel data or any other suitable data, such as GPGPU data. The display memory may be included as part of the memory 2304. The GPU(s) 2308 may include two or more GPUs operating in parallel (e.g., via a link). The link may directly connect the GPUs (e.g., using NVLINK) or may connect the GPUs through a switch (e.g., using NVSwitch). When combined together, each GPU 2308 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 2306 and/or the GPU(s) 2308, the logic unit(s) 2320 may be configured to execute at least some of the computer-readable instructions to control one or more components of the computing device 2300 to perform one or more of the methods and/or processes described herein. In embodiments, the CPU(s) 2306, the GPU(s) 2308, and/or the logic unit(s) 2320 may discretely or jointly perform any combination of the methods, processes and/or portions thereof. One or more of the logic units 2320 may be part of and/or integrated in one or more of the CPU(s) 2306 and/or the GPU(s) 2308 and/or one or more of the logic units 2320 may be discrete components or otherwise external to the CPU(s) 2306 and/or the GPU(s) 2308. In embodiments, one or more of the logic units 2320 may be a coprocessor of one or more of the CPU(s) 2306 and/or one or more of the GPU(s) 2308.

Examples of the logic unit(s) 2320 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 2310 may include one or more receivers, transmitters, and/or transceivers that enable the computing device 2300 to communicate with other computing devices via an electronic communication network, included wired and/or wireless communications. The communication interface 2310 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 2312 may enable the computing device 2300 to be logically coupled to other devices including the I/O components 2314, the presentation component(s) 2318, and/or other components, some of which may be built in to (e.g., integrated in) the computing device 2300. Illustrative I/O components 2314 include a microphone, mouse, keyboard, joystick, game pad, game controller, satellite dish, scanner, printer, wireless device, etc. The I/O components 2314 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 2300. The computing device 2300 may be include depth cameras, such as stereoscopic camera systems, infrared camera systems, RGB camera systems, touchscreen technology, and combinations of these, for gesture detection and recognition. Additionally, the computing device 2300 may include accelerometers or gyroscopes (e.g., as part of an inertia measurement unit (IMU)) that enable detection of motion. In some examples, the output of the accelerometers or gyroscopes may be used by the computing device 2300 to render immersive augmented reality or virtual reality.

The power supply 2316 may include a hard-wired power supply, a battery power supply, or a combination thereof. The power supply 2316 may provide power to the computing device 2300 to enable the components of the computing device 2300 to operate.

The presentation component(s) 2318 may include a display (e.g., a monitor, a touch screen, a television screen, a heads-up-display (HUD), other display types, or a combination thereof), speakers, and/or other presentation components. The presentation component(s) 2318 may receive data from other components (e.g., the GPU(s) 2308, the CPU(s) 2306, etc.), and output the data (e.g., as an image, video, sound, etc.).

Example Data Center

Figure 24:
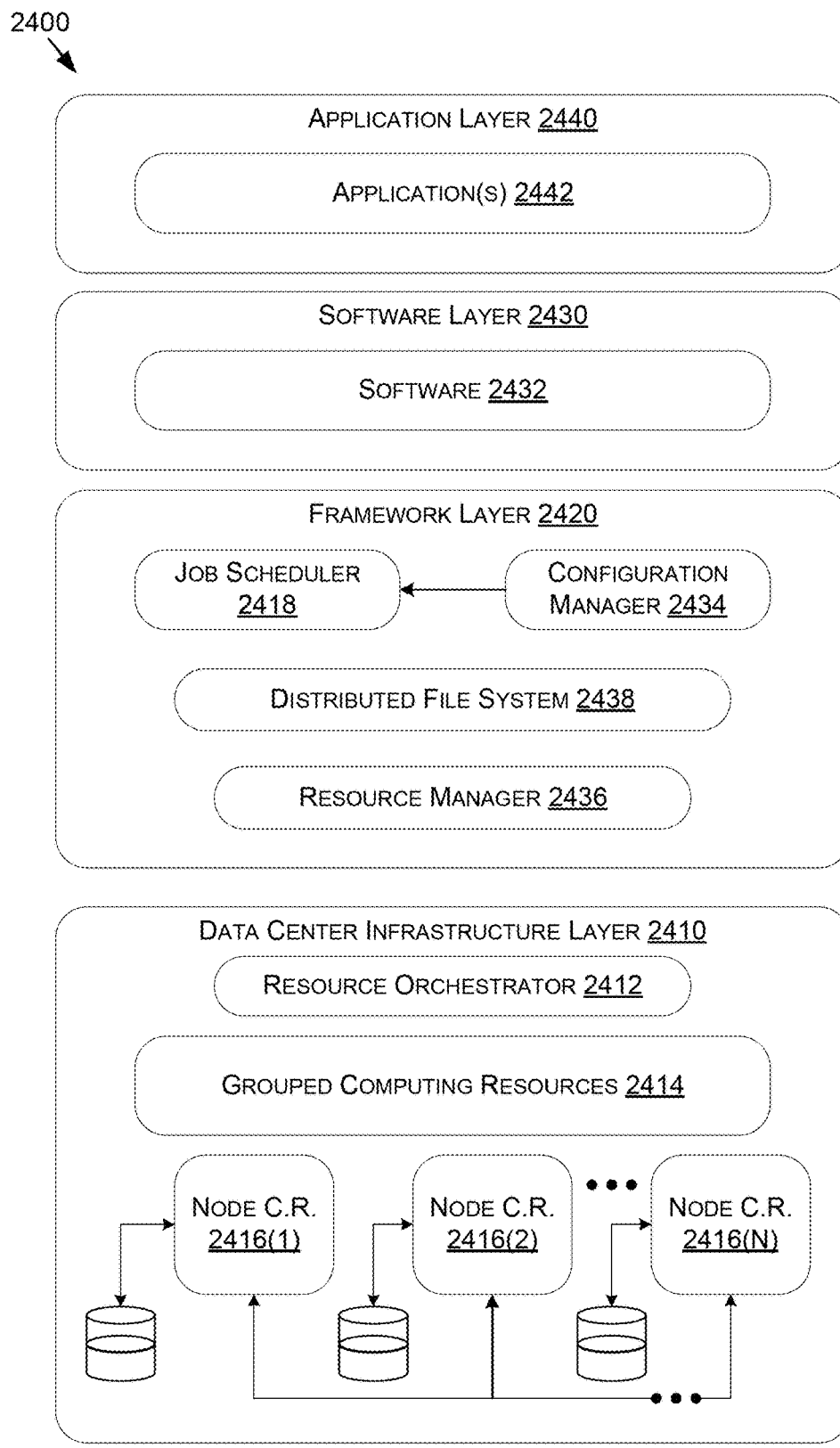
FIG. 24 is a block diagram of an example data center suitable for use in implementing some embodiments of the present disclosure.

FIG. 24 illustrates an example data center 2400 that may be used in at least one embodiments of the present disclosure. The data center 2400 may include a data center infrastructure layer 2410, a framework layer 2420, a software layer 2430, and/or an application layer 2440.

As shown in FIG. 24, the data center infrastructure layer 2410 may include a resource orchestrator 2412, grouped computing resources 2414, and node computing resources ("node C.R.s") 2416(1)-2416(N), where "N" represents any whole, positive integer. In at least one embodiment, node C.R.s 2416(1)-2416(N) may include, but are not limited to, any number of central processing units (CPUs) or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 2416(1)-2416(N) may correspond to a server having one or more of the above-mentioned computing resources. In addition, in some embodiments, the node C.R.s 2416(1)-24161(N) may include one or more virtual components, such as vGPUs, vCPUs, and/or the like, and/or one or more of the node C.R.s 2416(1)-2416(N) may correspond to a virtual machine (VM).

In at least one embodiment, grouped computing resources 2414 may include separate groupings of node C.R.s 2416 housed within one or more racks (not shown), or many racks housed in data centers at various geographical locations (also not shown). Separate groupings of node C.R.s 2416 within grouped computing resources 2414 may include grouped compute, network, memory or storage resources that may be configured or allocated to support one or more workloads. In at least one embodiment, several node C.R.s 2416 including CPUs, GPUs, and/or other processors may be grouped within one or more racks to provide compute resources to support one or more workloads. The one or more racks may also include any number of power modules, cooling modules, and/or network switches, in any combination.

The resource orchestrator 2422 may configure or otherwise control one or more node C.R.s 2416(1)-2416(N) and/or grouped computing resources 2414. In at least one embodiment, resource orchestrator 2422 may include a software design infrastructure (SDI) management entity for the data center 2400. The resource orchestrator 2422 may include hardware, software, or some combination thereof.

In at least one embodiment, as shown in FIG. 24, framework layer 2420 may include a job scheduler 2418, a configuration manager 2434, a resource manager 2436, and/or a distributed file system 2438. The framework layer 2420 may include a framework to support software 2432 of software layer 2430 and/or one or more application(s) 2442 of application layer 2440. The software 2432 or application(s) 2442 may respectively include web-based service software or applications, such as those provided by Amazon Web Services, Google Cloud and Microsoft Azure. The framework layer 2420 may be, but is not limited to, a type of free and open-source software web application framework such as Apache Spark™ (hereinafter "Spark") that may utilize distributed file system 2438 for large-scale data processing (e.g., "big data"). In at least one embodiment, job scheduler 2418 may include a Spark driver to facilitate scheduling of workloads supported by various layers of data center 2400. The configuration manager 2434 may be capable of configuring different layers such as software layer 2430 and framework layer 2420 including Spark and distributed file system 2438 for supporting large-scale data processing. The resource manager 2436 may be capable of managing clustered or grouped computing resources mapped to or allocated for support of distributed file system 2438 and job scheduler 2418. In at least one embodiment, clustered or grouped computing resources may include grouped computing resource 2414 at data center infrastructure layer 2410. The resource manager 1036 may coordinate with resource orchestrator 2412 to manage these mapped or allocated computing resources.

In at least one embodiment, software 2432 included in software layer 2430 may include software used by at least portions of node C.R.s 2416(1)-2416(N), grouped computing resources 2414, and/or distributed file system 2438 of framework layer 2420. One or more types of software may include, but are not limited to, Internet web page search software, e-mail virus scan software, database software, and streaming video content software.

In at least one embodiment, application(s) 2442 included in application layer 2440 may include one or more types of applications used by at least portions of node C.R.s 2416 (1)-2416(N), grouped computing resources 2414, and/or distributed file system 2438 of framework layer 2420. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 2434, resource manager 2436, and resource orchestrator 2412 may implement any number and type of self-modifying actions based on any amount and type of data acquired in any technically feasible fashion. Self-modifying actions may relieve a data center operator of data center 2400 from making possibly bad configuration decisions and possibly avoiding underutilized and/or poor performing portions of a data center.

The data center 2400 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 2400. In at least one embodiment, trained or deployed machine learning models corresponding to one or more neural networks may be used to infer or predict information using resources described above with respect to the data center 2400 by using weight parameters calculated through one or more training techniques, such as but not limited to those described herein.

In at least one embodiment, the data center 2400 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 2300 of FIG. 23—e.g., each device may include similar components, features, and/or functionality of the computing device(s) 2300. In addition, where backend devices (e.g., servers, NAS, etc.) are implemented, the backend devices may be included as part of a data center 2400, an example of which is described in more detail herein with respect to FIG. 24.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 2300 described herein with respect to FIG. 23. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
computing an accumulation speed for at least one pixel based at least on an angle between a first view vector that corresponds to the at least one pixel and a second view vector that corresponds to the at least one pixel;
accumulating one or more samples with a first accumulated render of a virtual environment using the accumulation speed for the at least one pixel to generate a second accumulated render of a virtual environment; and
generating a rendered frame based at least on denoising at least one sample corresponding to the virtual environment using the second accumulated render.

2. The method of claim 1, wherein the accumulation speed is further based on one or more of a surface roughness that corresponds to an interaction of the first view vector or a viewing angle associated with the first view vector.

3. The method of claim 1, wherein the denoising includes one or more of:
applying one or more denoising filters to the second accumulated render;
accumulating at least a portion of the second accumulated render with a noisy render of the virtual environment to generate a third accumulated render of the virtual environment, and applying one or more denoising filters to the third accumulated render; or
determining, using the second accumulated render, one or more dimensions of one or more denoising filters used to generate the rendered frame.

4. The method of claim 1, wherein the computing of the accumulation speed uses an adjustment factor that increases a sensitivity of the accumulation speed to the angle between the first view vector and the second view vector as a viewing angle associated with the first view vector decreases.

5. The method of claim 1, wherein the computing of the accumulation speed uses an adjustment factor that increases the accumulation speed as the angle between the first view vector and the second view vector increases.

6. The method of claim 1, wherein the first view vector is used to generate a first ray-traced render of a virtual environment and the second view vector is used to generate a second ray-traced render of the virtual environment, and the first accumulated render corresponds to the second ray-traced render.

7. The method of claim 1, wherein the one or more samples are from a ray-traced render of the virtual environment and correspond to the at least one pixel.

8. The method of claim 1, wherein computing of the accumulation speed is further based on a surface normal associated with the first view vector.

9. A processor comprising:
one or more circuits to:
compute an accumulation speed based at least on parallax between ray-traced renders of a virtual environment;
accumulate one or more samples to a first accumulated render of the virtual environment using the accumulation speed to generate a second accumulated render of the virtual environment; and
generate a rendered frame based at least on denoising at least one sample corresponding to the virtual environment using the second accumulated render.

10. The processor of claim 9, wherein the accumulation speed is further based on one or more of a surface roughness that corresponds to an interaction of a view vector associated with a viewing angle corresponding to one or more of the ray-traced renders.

11. The processor of claim 9, wherein a sensitivity of the accumulation speed to the parallax increases as a viewing angle corresponding to one or more of the ray-traced renders decreases.

12. The processor of claim 9, wherein the accumulation speed increases as the parallax increases.

13. The processor of claim 9, wherein the one or more circuits are further to compute the parallax based at least on an angle between a first view vector associated with a first of the ray-traced renders and a second view vector associated with a second of the ray-traced renders.

14. The processor of claim 9, wherein the accumulation speed is computed based on determining the parallax of at least one pixel and the one or more samples correspond to the at least one pixel.

15. The processor of claim 9, wherein the processor is comprised in at least one of:
a system for performing simulation operations;
a system for performing deep learning operations;
a system implemented using an edge device;
a system incorporating one or more virtual machines (VMs);
a system implemented at least partially in a data center; or
a system implemented at least partially using cloud computing resources.

16. A system comprising:
one or more processing units to execute operations comprising:
accumulating ray-traced renders of a virtual environment using accumulation speeds for pixels based at least on parallax between views of the virtual environment represented by the ray-traced renders; and
generating one or more rendered frames using data that is generated by the accumulating.

17. The system of claim 16, wherein the accumulation speeds are further based on one or more of surface roughness values that correspond to interactions of view vectors associated with viewing angles of the virtual environment captured by the ray-traced renders.

18. The system of claim 16, wherein a sensitivity of the accumulation speeds to the parallax increases as viewing angles decrease, the viewing angles corresponding to interactions of view vectors with the virtual environment.

19. The system of claim 16, wherein the accumulation speeds increase as the parallax increases.

20. The system of claim 16, wherein the operations further comprise determining the accumulation speeds based at least on computing the parallax using angles between view vectors associated with the pixels.

21. The system of claim 16, wherein the accumulation speeds are further based on surface normals associated with view vectors that have viewing angles.

\* \* \* \* \*